(12) United States Patent
Dulebenets

(10) Patent No.: US 11,222,304 B2
(45) Date of Patent: Jan. 11, 2022

(54) AUTOMATED SCHEDULING AND VESSEL NAVIGATION SYSTEM FOR CONTAINER SHIPPING

(71) Applicant: Florida A&M University, Tallahassee, FL (US)

(72) Inventor: Maxim A. Dulebenets, Tallahassee, FL (US)

(73) Assignee: Florida A&M University, Tallahassee, FL (US)

( * ) Notice: Subject to any disclaimer, the term of this patent is extended or adjusted under 35 U.S.C. 154(b) by 363 days.

(21) Appl. No.: 16/378,754

(22) Filed: Apr. 9, 2019

(65) Prior Publication Data

US 2019/0311324 A1    Oct. 10, 2019

Related U.S. Application Data

(60) Provisional application No. 62/655,450, filed on Apr. 10, 2018.

(51) Int. Cl.
*G06Q 10/08* (2012.01)
*G06Q 10/06* (2012.01)
*G06Q 10/04* (2012.01)

(52) U.S. Cl.
CPC ......... *G06Q 10/0835* (2013.01); *G06Q 10/04* (2013.01); *G06Q 10/06311* (2013.01)

(58) Field of Classification Search
CPC .............. G06Q 10/0835; G06Q 10/04; G06Q 10/06311

(Continued)

(56) References Cited

U.S. PATENT DOCUMENTS

| 2007/0027740 A1* | 2/2007 | Babu | G06Q 10/00 |
| | | | 705/26.8 |
| 2007/0050069 A1* | 3/2007 | Treichler | G06Q 10/04 |
| | | | 700/99 |

(Continued)

OTHER PUBLICATIONS

A Method of Ship Scheduling and Inventory Management Problem for Reducing Demurrage and Freight (Year: 2017).*

(Continued)

*Primary Examiner* — Zeina Elchanti
(74) *Attorney, Agent, or Firm* — Smith & Hopen, P.A.; Paul Murty

(57) ABSTRACT

A methodology and/or system to automatically generate an optimal collaborative agreement, according to which multiple vessel arrival time windows, start and end times for each time window, and multiple handling rates during each time window are offered by the marine container terminal operator to the liner shipping company at each port of the given liner shipping route. The vessel scheduling problem is formulated as a mixed integer nonlinear programming model, where the total liner shipping route service cost is minimized. A set of linearization techniques are applied to the original model, and the linearized model is solved using CPLEX. A number of computational experiments were performed for the Pacific Atlantic 1 liner shipping route, served by the NYK liner shipping company, with results showing effectiveness of the proposed collaborative agreement and the adopted solution methodology to improve liner shipping operations.

4 Claims, 9 Drawing Sheets

(58) Field of Classification Search
USPC .......................................................... 705/336
See application file for complete search history.

(56) References Cited

U.S. PATENT DOCUMENTS

| | | | | |
|---|---|---|---|---|
| 2009/0097355 | A1* | 4/2009 | Clement | G01V 1/3835 367/19 |
| 2014/0180954 | A1* | 6/2014 | Roberts | G06Q 10/047 705/335 |
| 2017/0091681 | A1* | 3/2017 | Lanzieri | G06Q 10/083 |
| 2018/0075408 | A1* | 3/2018 | Subramanian ... | G06Q 10/08345 |

OTHER PUBLICATIONS

Unctad, "Review of Maritime Transport 2016," United Nations Conference on Trade and Development, New York and Geneva, 2016.

Caballini, C. et al., An event-triggered receding-horizon scheme for planning rail operations in maritime terminals, IEEE Trans. Intell. Transp. Syst., Feb. 2014, vol. 15, No. 1, pp. 365-375.

Alessandri, A. et al., Predictive control of container flows in maritime intermodal terminals, IEEE Trans. Control Syst. Technol., Jul. 2013, vol. 21, No. 4, pp. 1423-1431.

Chen, L. et al., Container port performance measurement and comparison leveraging ship GPS traces and maritime open data, IEEE Trans. Intell. Transp. Syst., May 2016, vol. 17, No. 5, pp. 1227-1242.

Dulebenets, M.A., Application of evolutionary computation for berth scheduling at marine container terminals: Parameter tuning versus parameter control, IEEE Trans. Intell. Transp Syst., Jan. 2018, vol. 19, No. 1, pp. 25-37.

Abatte, S. et al., An integer linear programming approach for radio-based localization of shipping containers in the presence of incomplete proximity information, IEEE Trans. Intell. Transp. Syst., Sep. 2012, vol. 13, No. 3, pp. 1404-1419.

World Shipping Council. May 28, 2015. Some Observations on Port Congestion, Vessel Size and Vessel Sharing Agreements. [Online]. Available: www.worldshipping.org.

Maersk. May 2017. The World's Largest Ship. [Online], https://en.wikipedia.org/wiki/Maersk_Triple_E-class_container_ship, Accessed Jul. 9, 2019.

Journal of Commerce. May 2017. First of 11 record-breaking Maersk ships enters Asia-Europe. [Online], Available: www.joc.com.

Journal of Commerce. Jul. 2015. Largest container ships on order to rise 13 percent by 2020. [Online]. Available: www.ioc.com. Accessed Jun. 10, 2019.

Flexport. Apr. 2017. What the new ocean carrier alliances mean for your freight. [Online]. Available: https://www.flexport.com/blog/what-are-ocean-alliances/.

Meng, Q. et al., Containership routing and scheduling in liner shipping: Overview and future research directions, Transp. Sci., May 2014, vol. 48, No. 2, pp. 265-280.

Dulebenets, M.A. et al., Vessel scheduling in liner shipping: Modeling transport of perishable assets, Int. J. Prod. Econ., Feb. 2017, vol. 184, pp. 141-156.

Alix, Y. et al., Alliance or acquisition? Strategies for growth in the container shipping industry, the case of CP ships, J. Transp. Geogr., Sep. 1999, vol. 7, No. 3, pp. 203-208.

Agarwal, R. et al., Network design and allocation mechanisms for carrier alliances in liner shipping, Oper. Res., Dec. 2010, vol. 58, No. 6, pp. 1726-1742.

Panayides, P. et al., Strategic alliances in container liner shipping, Res. Transp. Econ., Aug. 2011, vol. 32, pp. 25-38.

Ding, J., et al., Using fuzzy MCDM to select partners of strategic alliances for liner shipping, Inform. Sci., Jun. 2005, vol. 173, pp. 197-225.

Lei, L. et al., Collaborative vs. non-collaborative container-vessel scheduling, Transp. Res. Part E, May 2008, vol. 44, No. 3, pp. 504-520.

Yang, D. et al., Verifying liner Shipping Alliance's stability by applying core theory, Res. Transp. Econ., Aug. 2011, vol. 32, pp. 15-24.

Wang, S. et al., Liner ship route schedule design with port time windows, Transp. Res. Part C, Apr. 2014, vol. 41, pp. 1-17.

Alhrabi, A. et al., Schedule design for sustainable container supply chain networks with port time windows, Adv. Eng. Informat., Aug. 2015, vol. 29, No. 3, pp. 322-331.

Wang, S. et al., Collaborative mechanisms for berth allocation, Adv. Eng. Informat., Aug. 2015, vol. 29, No. 3, pp. 332-338.

Dulebenets, M.A. et al., Models and solution algorithms for improving operations in marine transportation, Ph.D. Dissertation, Dept. Civ. Eng., Univ Memphis, Memphis, TN, Aug. 2015.

Liu, Z. et al., Supply chain cost minimization by collaboration between liner shipping companies and port operators, Transp. J., Aug. 2016, vol. 55, No. 3, pp. 296-314.

NYK. May 2017. Container service network. [Online], Available: https://www.nykline.com.

Sea-Distances.org. May 2017. Distances between ports. [Online]. Available: https://sea-distances.org/. Accessed Jul. 7, 2019.

Wang, S. et al., Sailing speed optimization for container ships in a liner shipping network, Transp. Res. Part E, May 2012, vol. 48, No. 3, pp. 701-714.

Wang, S. et al., Bunker consumption optimization methods in shipping: A critical review and extensions, Transp. Res. Part E, Jul. 2013, vol. 53, pp. 49-62.

Dulebenets, M.A. et al., Intermodal freight network design for transport of perishable products, Open J. Optim., Dec. 2016, vol. 5, No. 04, pp. 120-139.

Dulebenets, M.A., The green vessel scheduling problem with transit time requirements in a liner shipping route with emission control areas, Alexandria Eng. J., Jan. 2017, vol. 57, pp. 331-342.

Dulebenets, M.A., The vessel scheduling problem in a liner shipping route with heterogeneous vessel fleet, Int. J. Civ. Eng., Jan. 2018, vol. 16, pp. 19-32.

Dulebenets, M.A., Advantages and disadvantages from enforcing emission restrictions within emission control areas, Maritime Bus. Rev., Dec. 2016, vol. 1, No. 02, pp. 107-132.

Dulebenets, M.A., A new simulation model for a comprehensive evaluation of yard truck deployment strategies at marine container terminals, Open Sci. J., Oct. 2016, pp. 1-28.

Zampelli, S. et al., The berth allocation and quay crane assignment problem using a CP approach, in Principles and Practice of Constraint Programming, 2013, vol. 8124. Springer, pp. 880-896. [Online]. Available: http://link.springer.com/chapter/10.1007/978-3-642-40627-0_64.

World Bank, May 2017. Cost to import (US$ per container). [Online], Available: http://data.worldbank.org/. Accessed May 29, 2019.

Dulebenets, M.A., Green vessel scheduling in liner shipping: Modeling carbon dioxide emission costs in sea and at ports of call, Int. J. Transp. Sci. Technol., Mar. 2018, vol. 7, pp. 26-44.

Dulebenets, M.A., Bunker consumption optimization in liner shipping: A metaheuristic approach, Int. J. Recent Innov. Trends Comput Commun., Jun. 2015, vol. 3, No. 06, pp. 3766-3776.

* cited by examiner

AUTOMATED SCHEDULING AND VESSEL NAVIGATION SYSTEM FOR CONTAINER SHIPPING

CROSS-REFERENCE TO RELATED APPLICATIONS

This nonprovisional application claims priority to U.S. Provisional Patent Application No. 62/655,450, entitled "A New Form of a Collaborative Agreement Between Liner Shipping Companies and Marine Container Terminal Operators for Cost-efficient Container Shipping," filed Apr. 10, 2018 by the same inventors, the entirety of which is incorporated herein by this reference.

TECHNICAL FIELD

This invention relates, generally, to vessel scheduling in liner shipping. More specifically, it relates to automatically creating improved collaborative agreements between liner shipping companies and marine container terminal operators, where the liner shipping company negotiates vessel arrival time windows, start and end times for the available time windows, and vessel handling rates during the available time windows with the marine container terminal operator at each port of call.

BACKGROUND

The total volumes of the international seaborne trade have been significantly growing over the last years. The total volumes of the major cargo types, transported by vessels (including containerized cargo, dry bulk cargo, main bulk commodities, oil, and gas), reached approximately 10 billion tons in 2015, which is the highest value recorded over the last 35 years [1]. The world vessel fleet increased by 1.6% in 2016 as compared to 2015 and reached 90,917 vessels [1]. In order to serve the growing demand for the international seaborne trade efficiently, both liner shipping companies and marine container terminal operators have to focus on development and implementation of innovative strategies, which will allow enhancing effectiveness of the transport and handling processes [2]-[6]. Liner shipping companies, responsible for the transport of containers on vessels between ports of call, and marine container terminal operators, responsible for the container handling at ports of call, have to focus on deployment of innovative strategies, which will allow improving the operations efficiency and serving the existing demand.

The following two strategies have been frequently applied by liner shipping companies over the last years [7]: (1) increasing size of vessels; and (2) formation of alliances. The size of vessels increased by more than 1,300% since 1968 from 1,530 twenty foot-equivalent units (TEUs) to 20,000+TEUs today. Liner shipping companies tend to deploy larger vessels for service of their routes due to economies of scale. Specifically, larger vessels can carry more containers, and, therefore, the unit transportation cost per TEU will be lower as compared to the medium and small size vessels. In July 2013, the Maersk liner shipping company started deployment of Triple E vessels with 18,000-TEU capacity. Construction of Triple E vessels is driven with the following principles [8]: "economy of scale, energy efficient, and environmentally improved". New hull design, energy-efficient engine, and exhaust gas system allowed significantly improving energy efficiency. Furthermore, Triple E vessels produce 35% less carbon dioxide emissions per container move as compared to the industry average for the Asia-Europe liner shipping routes. Due to advantages that can be achieved from deployment of larger vessels, liner shipping companies continue increasing the vessel size. In April 2017, Maersk launched a 20,568-TEU vessel (Maersk Madrid) for service of the liner shipping route, connecting Asia and Europe [9]. The MOL, MSC, and CSCL liner shipping companies also deploy vessels with capacity greater than 19,000 TEUs at their routes. According to the projections, reported by the Journal of Commerce [10], the amount of large size vessels is expected to increase at least by 13.0% towards 2020.

Along with increasing size of vessels, many liner shipping companies started forming alliances. Formation of alliances allows liner shipping companies serving the existing demand efficiently by sharing the available capacity of vessels (i.e., allocate container slots on the vessels for the containers of another liner shipping company). As of April 2017, the list of the largest liner shipping alliances includes the following [11]: (1) 2M Alliance (represented by the Maersk and MSC shipping companies); (2) Ocean Alliance (represented by the CMA CGM, COSCO, OOCL, and Evergreen shipping companies); and (3) The Alliance (represented by the NYK, MOL, K Line, Hapag-Lloyd, and Yang Ming shipping companies).

Increasing size of vessels and formation of liner shipping alliances allow improving the efficiency of liner shipping operations; however, without construction of efficient vessel schedules, liner shipping companies may incur substantial monetary losses. Throughout vessel scheduling, liner shipping companies have to select the vessel sailing speed between consecutive ports, arrival times at ports, handling rates at ports, departure times from ports, and determine the required number of vessels for service of a given route [12], [13]. The vessel scheduling problem is a tactical level problem, where the port rotation (i.e., the sequence of ports to be visited) is already determined by the liner shipping company. The latter decision is usually made at the strategic level based on the existing demand, market conditions, and expected revenue to be generated [12]. The ports of call should be visited by vessels with a specific frequency. Decisions of liner shipping companies on vessel arrival time windows (TWs) and handling rates, offered by marine container terminal operators, are critical for both supply chain players. Availability of multiple vessel arrival TWs and handling rates provides more flexibility to liner shipping companies in terms of port arrival scenarios, sailing and vessel handling time options (i.e., how much time should be spent at ports vs. how much time should be spent in sea), which may assist with reduction of the fuel consumption and port handling costs. Furthermore, collaborative agreements with liner shipping companies will allow marine container terminal operators improving efficiency of the terminal operations planning and alleviating port congestion [7].

Several previously conducted studies focused on collaborative agreements between liner shipping companies, including formation of alliances [14]-[16], selection of strategic alliance partners [17], collaborative and non-collaborative policies between liner shipping companies [18], and stability of liner shipping alliances [19]. However, only a limited number of vessel scheduling studies evaluated various collaborative agreements between liner shipping companies and marine container terminal operators, aiming to quantify advantages, which could be achieved from such agreements.

Wang et al. [20] modeled a collaborative agreement between the liner shipping company and marine container terminal operators, according to which multiple vessel arrival TWs were offered to the liner shipping company at each port of the liner shipping route. The objective function of the presented mathematical formulation aimed to minimize the total liner shipping route service cost. The original nonlinear model was linearized, and the global iterative optimization algorithm was developed to solve it. A set of computational experiments demonstrated that changes in the arrival TW duration significantly impacted the total route service cost, and lower transit times were recorded for the high-value product types. A similar collaborative agreement was evaluated by Alhrabi et al. [21]. It was found that availability of multiple TWs at ports of the liner shipping route could affect the vessel sailing speed, the total number of vessels to be deployed for service of the route, and the total liner shipping route service cost. The importance of selecting vessel arrival TWs for the liner shipping and marine container terminal operations is also discussed in Wang et al. [22].

Dulebenets [23] presented a mathematical model for a collaborative agreement, where the marine container terminal operators were able to offer multiple handling rates to the liner shipping company at ports of call. The objective of the nonlinear model minimized the total liner shipping route service cost. A static secant approximation was applied to linearize the model, and the linearized model was solved using CPLEX. Numerical experiments showed that substantial cost savings could be achieved by the liner shipping company as a result of selecting the appropriate handling rates from the available handling rates, offered by the marine container terminal operators. Liu et al. [24] applied the same type of a collaborative agreement as Dulebenets [23], where the liner shipping company was offered multiple handling rates at ports of call. The objective of the presented mathematical formulation aimed to minimize the sum of fuel consumption and port handling costs. The global optimization algorithm was developed to solve the problem. A set of computational experiments, conducted for the CCX liner shipping route, demonstrated that the collaborative agreement could assist liner shipping companies with reduction of the fuel consumption costs.

A review of the liner shipping literature indicates that collaborative agreements between liner shipping companies and marine container terminal operators receive an increasing attention from the community. The collaborative agreements, presented in the literature, can be classified in two groups: (1) multiple vessel arrival TWs are offered to the liner shipping company at each port, while the vessel handling rates are assumed to be fixed [20]-[21]; and (2) multiple vessel handling rates are offered to the liner shipping company at each port, while the vessel arrival TWs are assumed to be fixed [23]-[24]. However, more comprehensive and realistic agreements are needed.

Accordingly, what is needed is a methodology and a system that improves efficiency of the liner shipping operations and reduces the associated costs. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present disclosure may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

SUMMARY

This summary is provided to introduce a selection of concepts in a simplified form. These concepts are described in further detail in the detailed description of example embodiments of the disclosure below. This summary is not intended to identify key features or essential features of the claimed subject matter, nor is it intended to be used to limit the scope of the claimed subject matter.

Embodiments disclosed herein include methods and systems of designing and generating improved automatically generating collaborative agreements between a liner shipping company and a marine container terminal operator, as well as related steps. For example, in accordance with one embodiment, providing a computer with a graphical user interface and a processor; retrieving at least one of a set of factors; determining an optimal collaborative agreement using a mixed integer nonlinear optimization model executed by the processor in the computer using the at least one of the set of factors and delivering the optimal automatically generated collaborative agreement to the graphical user interface; wherein the practical application of the mixed integer nonlinear programming model improves the design of the optimal collaborative agreement; wherein the delivery of the collaborative agreement is automatically delivered to at least one vessel; wherein the delivery of the optimal collaborative agreement automatically adjusts a vessel's speed and course to implement the optimal collaborative agreement; and wherein the improved optimal collaborative agreement minimizes monetary losses to the liner shipping company. The automatic adjustment of speed a course may be implemented prior to departure or by remote communication with the vessel as scheduling needs and environmental factors are updated. In one embodiment, the automatic adjustment is remotely pushed to the vessel and presented to the crew for acceptance wherein the course, speed and other control parameters of the ship's operation are automatically downloaded to the navigation system of the ship wherein manual input (and user-error) is avoided. In another embodiment, the ship's location (e.g., in open waters) permits the automatic update to course and speed to be implemented without crew acceptance or approval. In yet another embodiment, the ship is autonomous (lacking crew or an actively engaged "on-duty" crew) wherein the update to speed and course is implemented without any human engagement on the vessel. The communication link to the vessel may be satellite, radio or other appropriate means based on the location of the ship.

In additional embodiments, the method of automatically generating collaborative agreements between a liner shipping company and a marine container terminal operator, the method comprising: providing a computer with a graphical user interface and a processor; retrieving a set of factors; delivering the set of factors to the computer; determining the optimal collaborative agreement between the liner shipping company and the marine container terminal operator using a mixed integer nonlinear programming model; wherein the mixed integer nonlinear programming model is linearized using a set of linearization techniques, and CPLEX is applied to solve the linearized model executed by the processor in the computer to automatically generate an optimal collaborative agreement and delivering the optimal collaborative agreement to the graphical user interface; wherein the mixed integer nonlinear programming model improves the generation of optimal collaborative agreements; wherein the delivery of the optimal collaborative agreement is automatically delivered to the liner shipping company and the marine container terminal operator; wherein the delivery of the optimal collaborative agreement automatically adjusts the vessel's speed and course to implement the optimal collaborative agreement; and wherein the improved automatically generated optimal collaborative agreement minimizes the total liner shipping route service cost.

In additional embodiments, the method of automatically generating collaborative agreements between a liner shipping company and a marine container terminal operator, wherein the set of factors comprise: multiple vessel arrival time windows (TWs), multiple start and end times for the available TWs, and multiple vessel handling rates during the available TWs are offered to the liner shipping company by the marine container terminal operator at each port of a liner shipping route.

In additional embodiments, the method of automatically generating collaborative agreements between a liner shipping company and a marine container terminal operator, wherein the set of factors further comprising an environmental variable which has an effect on a vessel's schedule, and wherein the environmental variable is delivered to the processor in the computer which automatically adjusts the vessel schedule based on the impact of the effect of the environmental variable.

In additional embodiments, the method of automatically generating collaborative agreements between a liner shipping company and a marine container terminal operator, wherein the environmental variable is selected from the group consisting of: weather, crew efficiency, and fuel cost.

In additional embodiments, the method of automatically generating collaborative agreements between a liner shipping company and a marine container terminal operator, wherein the automatically generated collaborative agreement decreases or eliminates the late arrival of vessels of liner shipping company.

In additional embodiments, the method of automatically generating collaborative agreements between a liner shipping company and a marine container terminal operator, wherein the automatic generation of the collaborative agreement improves efficiency of the supply chain operations and facilitates a timely delivery of products from the suppliers to an end customer in a cost-efficient manner.

In further embodiments, one or more tangible non-transitory computer-readable media having computer-executable instructions for performing a method of running a software program on a computing device, the computing device operating under an operating system, the method including issuing instructions from the software program comprising steps including: retrieving a set of factors; delivering the set of factors to the computer; determining the optimal collaborative agreement between the liner shipping company and the marine container terminal operator using a mixed integer nonlinear programming model; wherein the mixed integer nonlinear programming model is linearized using a set of linearization techniques, and CPLEX is applied to solve the linearized model executed by the processor in the computer to automatically generate an optimal collaborative agreement and delivering the optimal collaborative agreement to the graphical user interface; wherein the mixed integer nonlinear programming model improves the generation of optimal collaborative agreements; wherein the delivery of the optimal collaborative agreement is automatically delivered to the liner shipping company and the marine container terminal operator; wherein the delivery of the optimal collaborative agreement automatically adjusts the vessel's speed and course to implement the optimal collaborative agreement; and wherein the improved automatically generated optimal collaborative agreement minimizes the total liner shipping route service cost.

In further embodiments, a system for automatically generating collaborative agreements between a liner shipping company and a marine container terminal operator, the system comprising: a computer with a graphical user interface and a processor; a set of factors; wherein the set of factors are delivered to the computer; wherein the computer determines the optimal collaborative agreement between the liner shipping company and the marine container terminal operator using a mixed integer nonlinear programming model; wherein the mixed integer nonlinear programming model is linearized using a set of linearization techniques, and CPLEX is applied to solve the linearized model executed by the processor in the computer to automatically generate an optimal collaborative agreement and delivering the optimal collaborative agreement to the graphical user interface; wherein the mixed integer nonlinear programming model improves the generation of optimal collaborative agreements; wherein the delivery of the optimal collaborative agreement is automatically delivered to the liner shipping company and the marine container terminal operator; wherein the delivery of the optimal collaborative agreement automatically adjusts the vessel's speed and course to implement the optimal collaborative agreement; and wherein the improved automatically generated optimal collaborative agreement minimizes the total liner shipping route service cost.

BRIEF DESCRIPTION OF THE DRAWINGS

While the specification concludes with claims particularly pointing out and distinctly claiming what are regarded as embodiments of the invention, the advantages of embodiments of the disclosure may be more readily ascertained from the description of certain examples of embodiments of the disclosure when read in conjunction with the accompanying drawings, in which:

DETAILED DESCRIPTION

Figure 1:
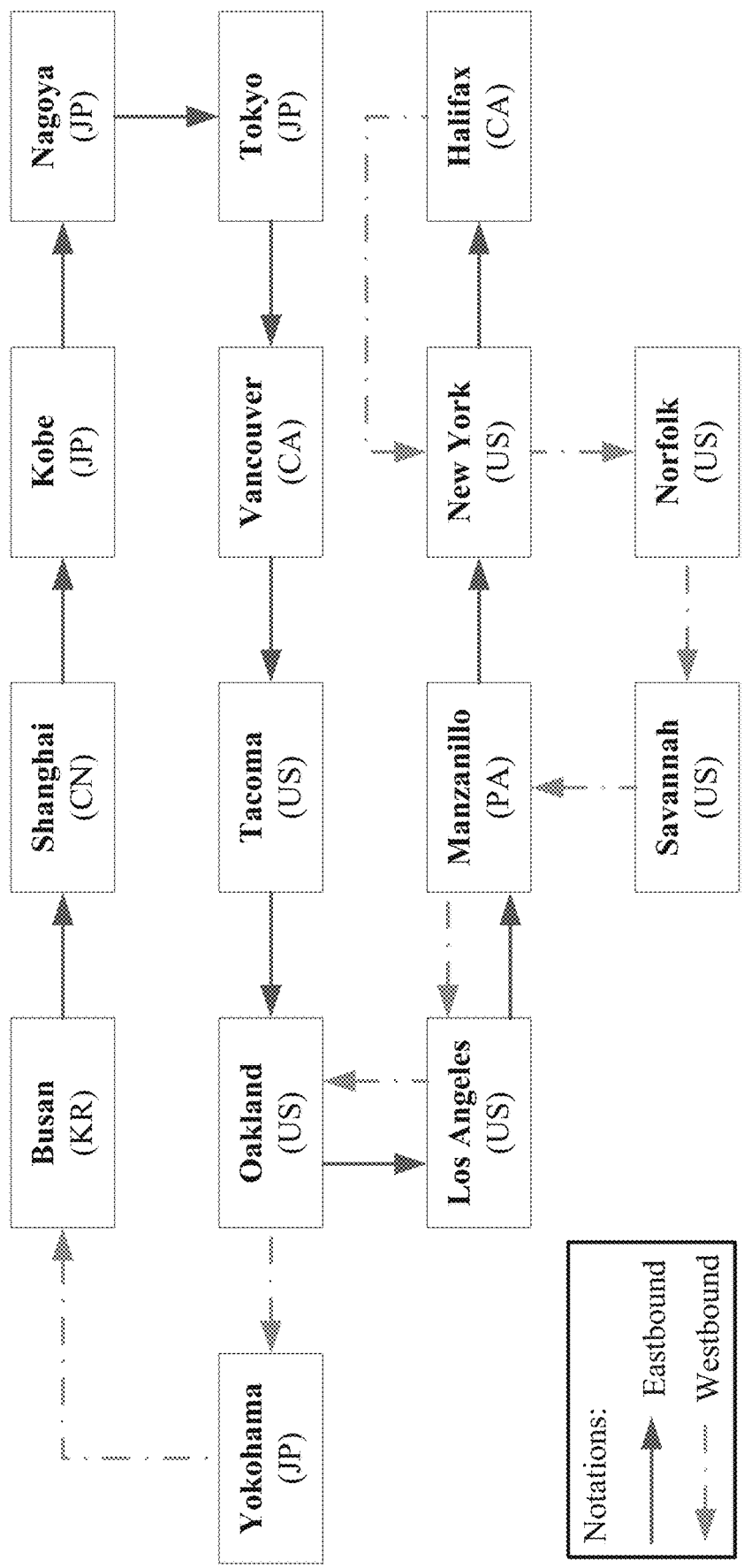
FIG. 1 depicts the Pacific Atlantic 1 liner shipping route.

In the following detailed description, reference is made to the accompanying drawings, which form a part thereof, and within which are shown by way of illustration specific embodiments by which the invention may be practiced. It is to be understood that other embodiments may be utilized, and structural changes may be made without departing from the scope of the present application. These embodiments are described in sufficient detail to enable those of ordinary skill in the art to practice the present disclosure, and it is to be understood that other embodiments may be utilized, and that structural, logical, and electrical changes may be made within the scope of the disclosure.

From the following descriptions, it should be understood that components of the embodiments as generally described and illustrated in the figures herein could be arranged and designed in a wide variety of different configurations. Thus, the following more detailed description of various embodiments, as represented in the figures, is not intended to limit the scope of the disclosure but is merely representative of various embodiments. While the various aspects of the embodiments are presented in drawings, the drawings are not necessarily drawn to scale unless specifically indicated.

The following description provides specific details, such as material types, compositions, material thicknesses, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional techniques employed in the industry. Only those process acts and structures necessary to understand the embodiments of the disclosure are described in detail below. A person of ordinary skill in the art will understand that some process components are inherently disclosed herein and that adding various conventional process components and acts would be in accord with the disclosure. In this description, specific implementations are shown and described only as examples and should not be construed as the only way to implement the present disclosure unless specified otherwise herein.

Illustrations presented herein are not meant to be actual views of any particular material, component, or system, but are merely idealized representations that are employed to describe embodiments of the disclosure. Referring in general to the following description and accompanying drawings, various embodiments of the present disclosure are illustrated to show its structure and method of operation. Common elements of the illustrated embodiments may be designated with similar reference numerals. It should be understood that the figures presented are not meant to be illustrative of actual views of any particular portion of the actual structure or method but are merely idealized representations employed to more clearly and fully depict the present invention defined by the claims below.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Any headings used herein should not be considered to limit the scope of embodiments of the invention as defined by the claims below and their legal equivalents. Concepts described in any specific heading are generally applicable in other sections throughout the entire specification.

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

As used herein, "about" means approximately or nearly and in the context of a numerical value or range set forth means±15% of the numerical. In an embodiment, the term "about" can include traditional rounding according to significant figures of the numerical value. In addition, the phrase "about 'x' to 'y'" includes "about 'x' to about 'y'".

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range.

The phrases "connected to" and "coupled to" refer to any form of interaction between two or more entities, including mechanical, electrical, magnetic, electromagnetic, fluid, and thermal interaction. Two components may be connected or coupled to each other even though they are not in direct contact with each other. For example, two components may be coupled to each other through an intermediate component.

The directional terms "proximal" and "distal" are used herein to refer to opposite locations on a device. The proximal end of the device is defined as the end of the device closest to the user when the device is in use. The distal end is the end opposite the proximal end, along the longitudinal direction of the device, or the end furthest from the user.

The use of "including," "comprising," or "having," "containing," "involving," and variations thereof herein, is meant to encompass the items listed thereafter and equivalents thereof as well as any additional items a person of ordinary skill in the art would reasonably understand to be included.

Referring in general to the following description and accompanying drawings, various embodiments of the present disclosure are illustrated to show its structure and method of operation. Common elements of the illustrated embodiments may be designated with similar reference numerals. Accordingly, the relevant descriptions of such features apply equally to the features and related components among all the drawings. Any suitable combination of the features, and variations of the same, described with components illustrated in FIG. 1, can be employed with the components of FIG. 2, and vice versa. This pattern of disclosure applies equally to further embodiments depicted in subsequent figures and described hereinafter. It should be understood that the figures presented are not meant to be illustrative of actual views of any particular portion of the actual structure or method but are merely idealized representations employed to more clearly and fully depict the present invention defined by the claims below.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

In certain embodiments, the claimed subject matter includes a practical application of a new form of an improved and automatically generated collaborative agreement between liner shipping companies and marine container terminal operators, where the liner shipping company negotiates vessel arrival time windows, start and end times for the available time windows, and vessel handling rates during the available time windows with the marine container terminal operator at each port of call. A mixed integer nonlinear programming model is developed for the vessel scheduling problem, which deploys the collaborative agreement, aiming to minimize the total liner shipping route service cost. A set of numerical experiments are conducted to evaluate the collaborative agreement between liner shipping companies and marine container terminal operators against the alternative collaborative agreements, which have been published in the liner shipping literature to date. Findings indicate that an improved, more comprehensive and realistic form of a collaborative agreement, as discussed in this specification, yields significant savings in terms of the total liner shipping route service cost over the existing collaborative agreements.

In certain embodiments, the claimed subject matter includes the automatic generation of a collaborative agreement that improves effectiveness of both liner shipping and marine container terminal operations. Specifically, collaborative agreements with liner shipping companies will allow marine container terminal operators utilizing the available handling resources more efficiently and alleviating port congestion. Furthermore, the ability to automatically negotiate the start times for a given vessel arrival time window at each port will allow liner shipping companies decreasing or even eliminating the waiting time of vessels, which arrived at the port before the negotiated vessel arrival time window. The ability to automatically negotiate the end times for a given vessel arrival time window at each port will allow liner shipping companies decreasing or even eliminating the late arrival hours of vessels. In the meantime, the ability to negotiate the handling rates with the marine container terminal operator at each port will provide more flexibility to liner shipping companies in terms of vessel handling and sailing time selection (i.e., how much time must be spent by vessels in sea vs. how much time must be spent by vessels at ports). The automatic generation of a collaborative agreement improves efficiency of the supply chain operations and facilitates a timely delivery of products from the suppliers to the end customers in a cost-efficient manner.

Example 1

This disclosure provides a novel method to automatically generate collaborative agreement, where the liner shipping company is offered multiple vessel arrival time windows (TWs), multiple start and end times for the available TWs, and multiple vessel handling rates during the available TWs at each port of call. The problem is formulated as a mixed integer nonlinear programming model, minimizing the total liner shipping route service cost. The original formulation is linearized using a set of linearization techniques, and CPLEX is applied to solve the linearized model. Computational experiments are performed for the Pacific Atlantic 1 liner shipping route, served by the NYK liner shipping company. In certain embodiments, the claimed subject matter—including the following non-limiting example—provides the following:

(1) A more comprehensive type of a collaborative agreement between the liner shipping company and marine container terminal operators is discussed (where multiple vessel arrival TWs, multiple start and end times for the available TWs, and multiple vessel handling rates during the available TWs are offered to the liner shipping company at each port);

(2) A detailed comparative analysis is conducted to assess advantages of the collaborative agreement over the other collaborative agreements, reported in the literature.

Problem Description

The following is a description of the problem studied herein, including the following aspects: (a) liner shipping route description; (b) collaborative agreement description; (c) fuel consumption modeling; (d) container inventory cost; and (e) vessel sailing speed selection.

Liner Shipping Route Description

A real-life liner shipping route was selected for evaluation of the current collaborative agreement. Specifically, this study focuses on modeling operations at the Pacific Atlantic 1 liner shipping route, which is served by the NYK liner shipping company. The Pacific Atlantic 1 liner shipping route connects Asia and North America. The port rotation (i.e., the sequence of ports to be visited) includes a total of 19 ports, which have to be served with a weekly frequency [25]. A schematic illustration of the liner shipping route is presented in FIG. 1. The distances between consecutive ports of call (in nautical miles—nmi) were calculated based on the information available at Sea-Distances.org [26] and are presented in square brackets:

(1) Busan, KR [535]→(2) Shanghai, CN [808]→(3) Kobe, JP [234]→(4) Nagoya, JP [342]→(5) Tokyo, JP [4,272]→(6) Vancouver, CA [146]→(7) Tacoma, US [816]→(8) Oakland, US [369]→(9) Los Angeles, US [2,951]→(10) Manzanillo, Pa. [1,972]→(11) New York, US [593]→(12) Halifax, Calif. [593]→(13) New York, US [287]→(14) Norfolk, US [505]→(15) Savannah, US [1,563]→(16) Manzanillo, Pa. [2,951]→(17) Los Angeles, US [369]→(18) Oakland, US [4,547]→(19) Yokohama, JP [657]→(1) Busan, KR.

Collaborative Agreement Description

Denote $P=\{1, \ldots, n\}$ as a set of ports that have to be visited by vessels of the NYK liner shipping company. Two consecutive ports p and p+1 are connected with voyage leg p. The NYK liner shipping company is assumed to have agreements with the marine container terminal operators, based on which: (1) each marine container terminal operator provides a set of vessel arrival TWs $T_p=\{1, \ldots, m_p\}$, $p \in P$; (2) for each TW there is a set of start times $S_{pt}=\{1, \ldots, g_{pt}\}$, $p \in P$, $t \in T_p$, and there is a set of end times $E_{pt}=\{1, \ldots, o_{pt}\}$, $p \in P$, $t \in T_p$; and (3) during each TW the marine container terminal operator provides a set of handling rates $H_{pt}=\{1, \ldots, w_{pt}\}$, $p \in P$, $t \in T_p$.

Figure 2:
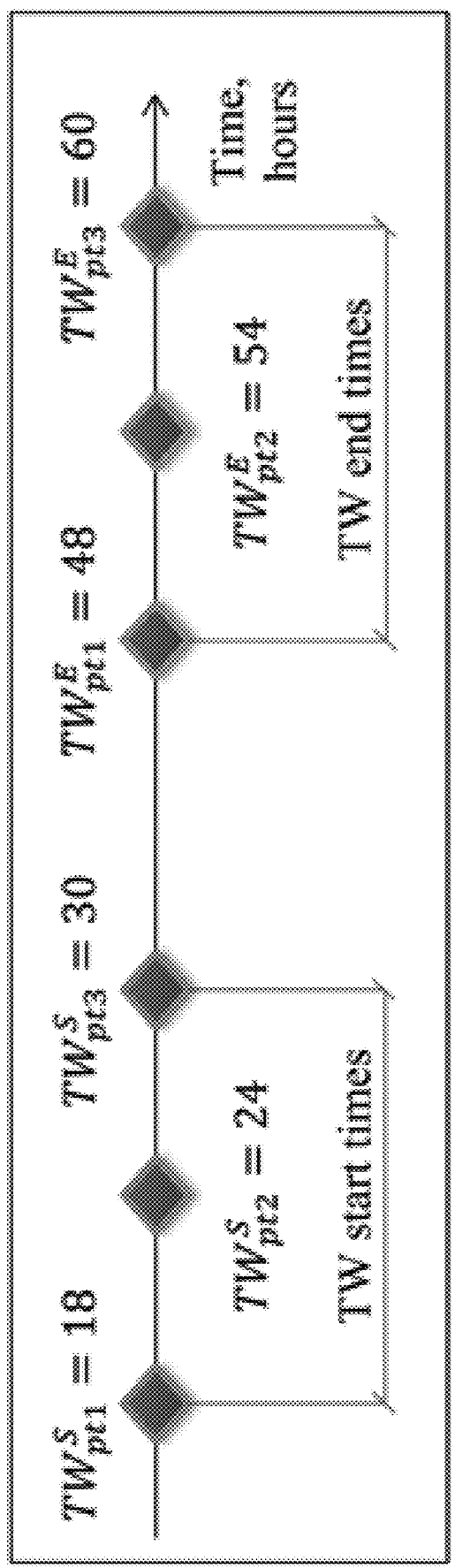
FIG. 2 depicts an example scenario with 3 start times and 3 end times for TW t at port p.

The arrival TW at each port is defined using two attributes: (1) $TW_{pts}^S$—is start time s for TW t at port p; and (2) $TW_{pte}^E$—is end time e for TW t at port p. FIG. 2 demonstrates a scenario, where there are 3 start times (18 hours, 24 hours, and 30 hours) and 3 end times (48 hours, 54 hours, and 60 hours) for TW t at port p. Note that the time units are selected to be hours, which can be easily converted to days. Assuming that time "0" starts on Monday at 12 am, the start times for TW t at port p for the considered example (see FIG. 2) are: (1) Monday 6 pm; (2) Tuesday 12 am; and (3) Tuesday 6 am. On the other hand, the end times for TW t at port p for the considered example (see FIG. 2) are: (1) Wednesday 12 am; (2) Wednesday 6 am; and (3) Wednesday 12 pm.

Figure 3:
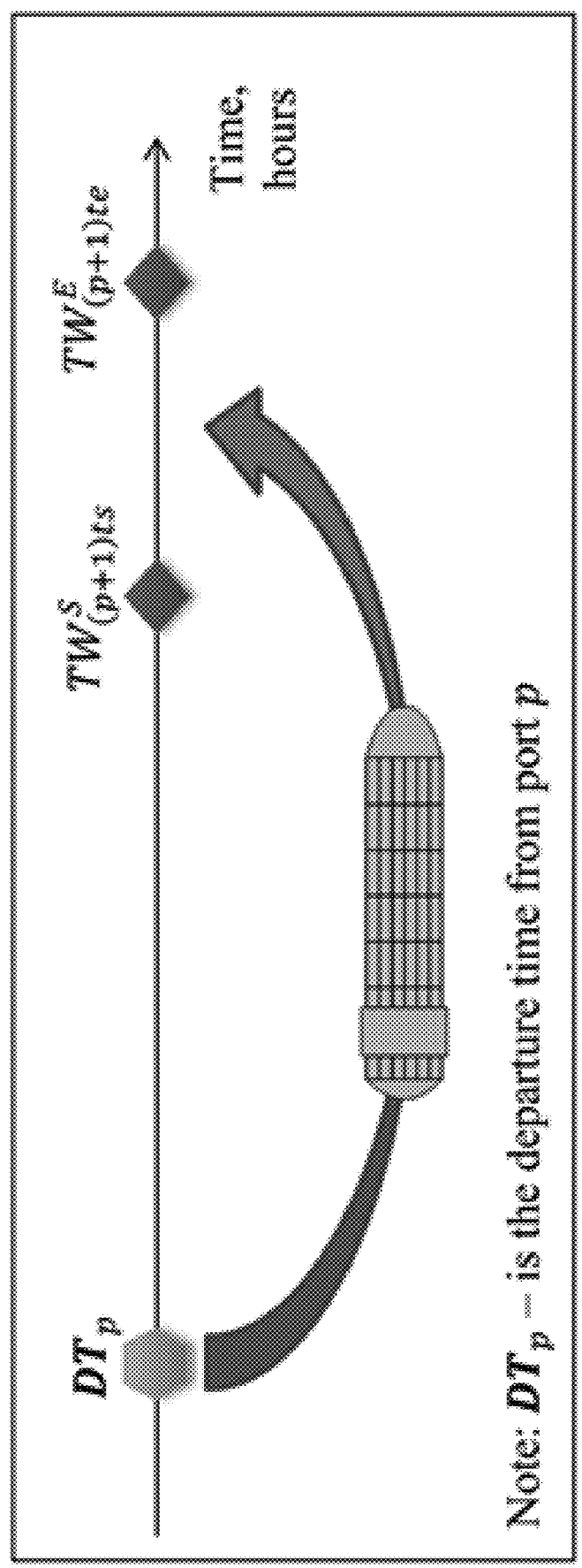
FIG. 3 depicts a timely vessel arrival at the next port.

A vessel is required to arrive at port p within selected arrival TW t, as illustrated in FIG. 3. A given vessel will have to wait in the dedicated area of port p, if it arrives at that port before the selected TW. Vessels, arriving after the end of selected arrival TW, may significantly disrupt the marine terminal operations (e.g., the terminal operator may have to divert the handling equipment from other berths to serve the vessel that arrived late, which may further cause delays in service of other vessels). Therefore, the liner shipping company will be imposed a penalty for late vessel arrivals, which can be estimated as follows: $TLP = \Sigma_{p \in P} c_p^{LT} LT_p$, where: TLP—is the total late arrival penalty (USD); $c_p^{LT}$—is the unit late vessel arrival penalty at port p (USD/hour); and $LT_p$—is the vessel late arrival hours at port p (hours).

Based on the collaborative agreement, the liner shipping company is offered a set of handling rates at each port of call. A handling productivity $HP_{pth}$, $p \in P$, $t \in T_p$, $h \in H_p t$ (measured in TEUs/hour) is associated with each handling rate. The handling time of a vessel at each port is estimated based on the container demand at a given port ($NC_p^{PORT}$, $p \in P$), measured in TEUs, and the requested handling productivity. The liner shipping company is expected to pay a vessel handling cost $c_{pth}^{HC}$, $p \in P$, $t \in T_p$, $h \in H_{pt}$ (measured in USD) for the requested handling rate during the selected TW at each port.

Note that, without loss of generality, the collaborative agreement, where the liner shipping company is offered m vessel arrival TWs at each port, g start times for the available TWs, o end times for the available TWs, and w vessel handling rates during the available TWs, can be transformed to the collaborative agreement, where the liner shipping company is offered (m·g·o) vessel arrival TWs at each port and w vessel handling rates during the available TWs. In the example, illustrated in FIG. 2, the collaborative agreement, where the liner shipping company is offered 3 start times and 3 end times for TW t at port p and w vessel handling rates during TW t, can be transformed to the collaborative agreement, where the liner shipping company is offered 3·3·m=9m vessel arrival TWs at port p (where m—is the total number of vessel arrival TWs) and w vessel handling rates during the available TWs. Transformation of the collaborative agreement will not affect the design of vessel schedules and the associated total route service costs, but it may affect the computational complexity of the mathematical model formulated for the suggested collaborative agreement.

The current collaborative agreement is expected to enhance efficiency of both liner shipping and marine container terminal operations. Specifically, availability of multiple start times for a given TW at each port will allow the NYK liner shipping company reducing or even eliminating the vessel waiting time. Moreover, availability of multiple end times for a given TW at each port will allow the NYK liner shipping company reducing or even eliminating the vessel late arrival hours. On the other hand, availability of multiple handling rates at each port will provide more flexibility to the NYK liner shipping company in terms of sailing and vessel handling time options (i.e., how much time should be spent at ports vs. how much time should be spent in sea). Furthermore, as discussed previously, collaborative agreements with the NYK liner shipping company will allow marine container terminal operators improving efficiency of the terminal operations planning at the Pacific Atlantic 1 liner shipping route and alleviating port congestion.

Fuel Consumption Modeling

A string of "homogeneous" vessels is deployed at the Pacific Atlantic 1 liner shipping route for transport of containers. Note that the term "homogeneous" is applied in the liner shipping literature to those vessels, which have similar technical specifications (e.g., vessel dimensions, capacity, structure of the main vessel engines, etc.). The fuel consumption by the main vessel engines is generally estimated based on the vessel sailing speed as follows [13], [23], [27], [28]:

$$FC_p = \frac{\gamma \cdot (v_p)^{\alpha-1}}{24} \forall p \in P,$$

where: $FC_p$—is the fuel consumption at voyage leg p (tons/nmi); $v_p$—is the vessel sailing speed at voyage leg p that connects ports p and p+1 (knots); and $\alpha$, $\gamma$—are the coefficients of the fuel consumption function. A potential reduction in the vessel sailing speed (and, hence, variations in the fuel consumption) due to adverse weather conditions, increasing height of waves, high speed of wind, and other factors is not modeled in this study. Note that this study will only model the fuel consumption by the main vessel engines (which are used to turn the vessel's propeller), as the fuel consumption by the auxiliary engines (which are used for providing power on the vessel) does not change throughout the voyage significantly and will be accounted for in the weekly vessel operational costs.

Container Inventory Cost

In order to construct an efficient vessel schedule for the Pacific Atlantic 1 route, the NYK liner shipping company has to account for the inventory cost, associated with transport of containers along the voyage legs of the route. Generally, the total container inventory cost in the liner shipping literature is calculated based on the total vessel sailing time and the total number of containers transported along the voyage legs as follows [13], [20]: $TIC = c^{IC} \Sigma_{p \in P} NC_p^{SEA} ST_p$, where: TIC—is the total container inventory cost (USD); $c^{IC}$—is the unit container inventory cost (USD per TEU per hour); $NC_p^{SEA}$—is the total amount of containers transported by vessels at voyage leg p (TEUs); $ST_p$—is the sailing time between consecutive ports p and p+1 (hours).

Vessel Sailing Speed Selection

In order to select an appropriate vessel sailing speed at each voyage leg of the Pacific Atlantic 1 route, the NYK liner shipping company has to consider a number of factors. Lower and upper bounds are generally set for the vessel sailing speed, where the sailing speed lower bound is established to decrease a potential wear of the vessels' main engines, while the sailing speed upper bound is limited by the capacity of the vessels' main engines [13]. A concept of "slow steaming" (i.e., selection of low sailing speeds) can be adopted by the NYK liner shipping company to reduce the fuel consumption. However, the latter will incur an increase in the total turnaround time of vessels and will require the NYK liner shipping company to deploy more vessels in order to guarantee the weekly service frequency at each port of the Pacific Atlantic 1 liner shipping route. In the meantime, the NYK liner shipping company should take into account the total number of vessels, allocated for service of the Pacific Atlantic 1 liner shipping route. The current collaborative agreement, where multiple vessel arrival TWs, multiple TW start and end times, and multiple vessel handling rates are offered to the liner shipping company by the marine container terminal operators, is expected to provide more flexibility to the liner shipping company in terms of selection of the vessel sailing speed at voyage legs.

Mathematical Model

Described herein are the notations that will be further used in this study and a mixed integer nonlinear programming model for the collaborative vessel scheduling problem, where multiple vessel arrival TWs, multiple start and end times for the available TWs, and multiple vessel handling rates during the available TWs are offered to the liner shipping company by the marine container terminal operator at each port of the liner shipping route.

Nomenclature

Sets

| | |
|---|---|
| $P = \{1, \ldots, n\}$ | set of ports in the liner shipping route |
| $T_p = \{1, \ldots, m_p\}, p \in P$ | set of arrival TWs available at port p |
| $S_{pt} = \{1, \ldots, g_{pt}\}, p \in P, t \in T_p$ | set of start times for TW t at port p |
| $E_{pt} = \{1, \ldots, o_{pt}\}, p \in P, t \in T_p$ | set of end times for TW t at port p |
| $H_{pt} = \{1, \ldots, w_{pt}\}, p \in P, t \in T_p$ | set of handling rates available at port p during TW t |

Decision Variables

| | |
|---|---|
| $v_p \in R^+ \; \forall p \in P$ | vessel sailing speed at voyage leg p that connects ports p and p + 1 |
| $z_{pt}^{TW} \in \{0,1\} \; \forall p \in P, t \in T_p$ | =1 if TW t is selected at port p (=0 otherwise) |
| $z_{pts}^{S} \in \{0,1\} \; \forall p \in P, t \in T_p, s \in S_{pt}$ | =1 if start time s is selected for TW t at port p (=0 otherwise) |
| $z_{pte}^{E} \in \{0,1\} \; \forall p \in P, t \in T_p, e \in E_{pt}$ | =1 if end time e is selected for TW t at port p (=0 otherwise) |
| $x_{pth} \in \{0,1\} \; \forall p \in P, t \in T_p, h \in H_{pt}$ | =1 if handling rate h is selected at port p during TW t (=0 otherwise) |

Auxiliary Variables

| | |
|---|---|
| $Q \in N$ | number of vessels to be deployed for service of the liner shipping route (vessels) |
| $AT_p \in R^+ \; \forall p \in P$ | vessel arrival time at port p (hours) |
| $HT_p \in R^+ \; \forall p \in P$ | vessel handling time at port p (hours) |
| $DT_p \in R^+ \; \forall p \in P$ | vessel departure time from port p (hours) |
| $WT_p \in R^+ \; \forall p \in P$ | vessel waiting time at port p (hours) |
| $ST_p \in R^+ \; \forall p \in P$ | vessel sailing time at voyage leg p that connects ports p and p + 1 (hours) |
| $FC_p \in R^+ \; \forall p \in P$ | fuel consumption at voyage leg p (tons/nmi) |
| $LT_p \in R^+ \; \forall p \in P$ | vessel late arrival hours at port p (hours) |

Parameters

| | |
|---|---|
| $n \in N$ | number of ports in a liner shipping route (ports) |
| $m_p \in N \; \forall p \in P$ | number of TWs available at port p (TWs) |
| $g_{pt} \in N \; \forall p \in P, t \in T_p$ | number of start times for TW t at port p (start times) |
| $o_{pt} \in N \; \forall p \in P, t \in T_p$ | number of end times for TW t at port p (end times) |
| $w_{pt} \in N \; \forall p \in P, t \in T_p$ | number of handling rates available at port p during TW t (rates) |
| $\alpha, \gamma$ | fuel consumption function coefficients |
| $c^{OC} \in R^+$ | weekly vessel operational cost (USD/week) |
| $c_p^{LT} \in R^+ \; \forall p \in P$ | unit late vessel arrival penalty at port p (USD/hour) |
| $c_p^{IC} \in R^+$ | unit container inventory cost (USD per TEU per hour) |
| $c^{FC} \in R^+$ | unit fuel cost (USD/ton) |
| $c_{pth}^{HC} \in R^+ \; \forall p \in P, t \in T_p, h \in H_{pt}$ | handling cost at port p under handling rate h during TW t (USD) |
| $l_p \in R^+ \; \forall p \in P$ | length of voyage leg p (nmi) |
| $NC_p^{SEA} \in N \; \forall p \in P$ | total amount of containers transported at voyage leg p (TEUs) |
| $NC_p^{PORT} \in N \; \forall p \in P$ | total amount of containers handled at port p (TEUs) |
| $v^{min} \in R^+$ | minimum vessel sailing speed (knots) |
| $v^{max} \in R^+$ | maximum vessel sailing speed (knots) |
| $Q^{max} \in N$ | maximum number of vessels allocated to serve the liner shipping route (vessels) |
| $HP_{pth} \in R^+ \; \forall p \in P, t \in T_p, h \in H_{pt}$ | handling productivity for handling rate h at port p during TW t (TEUs/hour) |
| $TW_{pts}^{S} \in R^+ \; \forall p \in P, t \in T_p, s \in S_{pt}$ | value of start time s for TW t at port p (hours) |
| $TW_{pte}^{E} \in R^+ \; \forall p \in P, t \in T_p, e \in E_{pt}$ | value of end time e for TW t at port p (hours) |

Model Formulation

A mixed integer nonlinear programming model for a collaborative vessel scheduling problem (that will be further referred to as CVSP) can be formulated as follows.

CVSP: Collaborative Vessel Scheduling Problem $$\min \left[ c^{OC} Q + c^{FC} \sum_{p \in P} l_p FC_p + \sum_{p \in P} \sum_{t \in T_p} \sum_{h \in H_{pt}} c_{pth}^{HC} x_{pth} + c^{IC} \sum_{p \in P} NC_p^{SEA} \right] \quad (1)$$

| CVSP: Collaborative Vessel Scheduling Problem |
|---|
| $$ST_p + + \sum_{p \in P} c_p^{LT} LT_p \Bigg]$$ |
| Subject to: (2) |
| $$\sum_{t \in T_p} z_{pt}^{TW} = 1 \ \forall \ p \in P \qquad (3)$$ |
| $$\sum_{t \in T_p} \sum_{s \in S_{pt}} z_{pts}^{S} = 1 \ \forall \ p \in P \qquad (4)$$ |
| $$z_{pts}^{S} \leq z_{pt}^{TW} \ \forall p \in P, t \in T_p, s \in S_{pt} \qquad (4)$$ |
| $$\sum_{t \in T_p} \sum_{e \in E_{pt}} z_{pte}^{s} = 1 \ \forall \ p \in P \qquad (5)$$ |
| $$z_{pte}^{E} \leq z_{pt}^{TW} \ \forall p \in P, t \in T_p, e \in E_{pt} \qquad (6)$$ |
| $$\sum_{t \in T_p} \sum_{h \in H_{pt}} x_{pth}^{s} = 1 \ \forall \ p \in P \qquad (7)$$ |
| $$x_{pth} \leq z_{pt}^{TW} \ \forall p \in P, t \in T_p, h \in H_{pt} \qquad (8)$$ |
| $$HT_p = \sum_{t \in T_p} \sum_{h \in H_{pt}} \left( \frac{NC_p^{PORt}}{HP_{pth}} \right) x_{pth} \forall \ p \in P \qquad (9)$$ |
| $$ST_p = \frac{l_p}{v_p} \forall \ p \in P \qquad (10)$$ |
| $$FC_p = \frac{\gamma \cdot (v_p)^{\alpha-1}}{24} \forall \ p \in P \qquad (11)$$ |
| $$WT_{p+1} \geq \sum_{t \in T_p} \sum_{s \in S_{pt}} TW_{(p+1)ts}^{S} z_{(p+1)ts}^{S} - AT_p - HT_p - ST_p \forall \ p \in P, p < n \qquad (12)$$ |
| $$WT_1 \geq \sum_{t \in T_p} \sum_{s \in S_{pt}} TW_{1ts}^{S} z_{1ts}^{S} - AT_p - HT_p - ST_p + 168Q \forall \ p \in P, p = n \qquad (13)$$ |
| $$DT_p = AT_p + WT_p + HT_p \ \forall_p \in P_t \qquad (14)$$ |
| $$LT_p \geq AT_p - \sum_{t \in T_p} \sum_{e \in E_{pt}} TW_{pte}^{E} z_{pte}^{E} \forall \ p \in P \qquad (15)$$ |
| $AT_{p+1} = DT_p + ST_p \ \forall_p \in P, p < n$ (16) |
| $AT_1 = DT_p + ST_p - 168Q \ \forall_p \in P, p = n$ (17) |
| $$168Q \leq \sum_{p \in P} ST_p + \sum_{p \in P} HT_p + \sum_{p \in P} WT_p \qquad (18)$$ |
| $Q \leq Q^{max}$ |
| $v^{min} \leq vp \leq v^{max} \ \forall_p \in P$ |

The objective function (1) of the CVSP mathematical model aims to minimize the total liner shipping route service cost, which is composed of the following components: (i) total vessel operational cost; (ii) total fuel consumption cost; (iii) total port handling cost; (iv) total container inventory cost; and (v) total late arrival penalty. Constraint set (2) ensures that only one TW is selected by the liner shipping company from the available vessel arrival TWs, offered by the marine container terminal operator at each port. Constraint set (3) indicates that only one start time is chosen by the liner shipping company at each port. Constraint set (4) guarantees that the start time is requested by the liner shipping company for the selected TW at each port. Constraint set (5) indicates that only one end time is chosen by the liner shipping company at each port. Constraint set (6) guarantees that the end time is requested by the liner shipping company for the selected TW at each port. Constraint set (7) ensures that only one handling rate is selected by the liner shipping company from the available vessel handling rates, offered by the marine container terminal operator at each port. Constraint set (8) guarantees that the handling rate is requested by the liner shipping company for the selected TW at each port. Constraint set (9) calculates the vessel handling time at each port.

Constraint set (10) computes the vessel sailing time at each voyage leg of the liner shipping route. Constraint set (11) estimates the total fuel consumption by the main vessel engines at each voyage leg. Constraint sets (12) and (13) calculate the vessel waiting time before the service start at each port. Constraint set (14) computes the vessel departure time from each port. Constraint set (15) estimates the vessel late arrival hours at each port. Constraint sets (16) and (17) calculate the vessel arrival time at the consecutive port of the liner shipping route. Constraint set (18) ensures that the weekly service will be provided at each port. The left-hand-side of the equality represents the product of the required number of vessels and numerical value "168", which is the total number of hours in a week. The right-hand-side of the equality represents the total vessel turnaround time for the given liner shipping route, which is estimated as a summation of the total vessel sailing time, the total vessel handling time, and the total vessel waiting time. Constraint set (19) indicates that the total number of vessels, deployed by the liner shipping company for service of the given liner shipping route, will not exceed the total number of available vessels. Constraint set (20) indicates that the vessel sailing speed should be within a specific range or certain limits (defined by the minimum and maximum vessel sailing speed values) at each voyage leg of the liner shipping route.

Solution Methodology

The CVSP mathematical model is nonlinear due to constraint sets (10) and (11). Note that constraint set (10) can be linearized by substitution of vessel sailing speed $v_p$, $\forall p \in P$ with its reciprocal $$u_p = \frac{1}{v_p},$$

$p \in P$. Constraint set (11) will remain nonlinear due to nonlinearity of the fuel consumption function. Denote $RF_p$ as the fuel consumption function, which is estimated based on vessel sailing speed reciprocal $u_p$. Several approaches have been reported in the liner shipping literature to address the issue of nonlinearity of the fuel consumption function, including the following [28]: (a) enumeration method; (b) discretization method; (c) dynamic programming method; (d) tailored method; and (e) second order cone programming method. A detailed description of advantages and disadvantages of the aforementioned methods is provided in Wang et al. [28]. A discretization method will be applied in this study in order to linearize the CVSP mathematical model.

Figure 4:
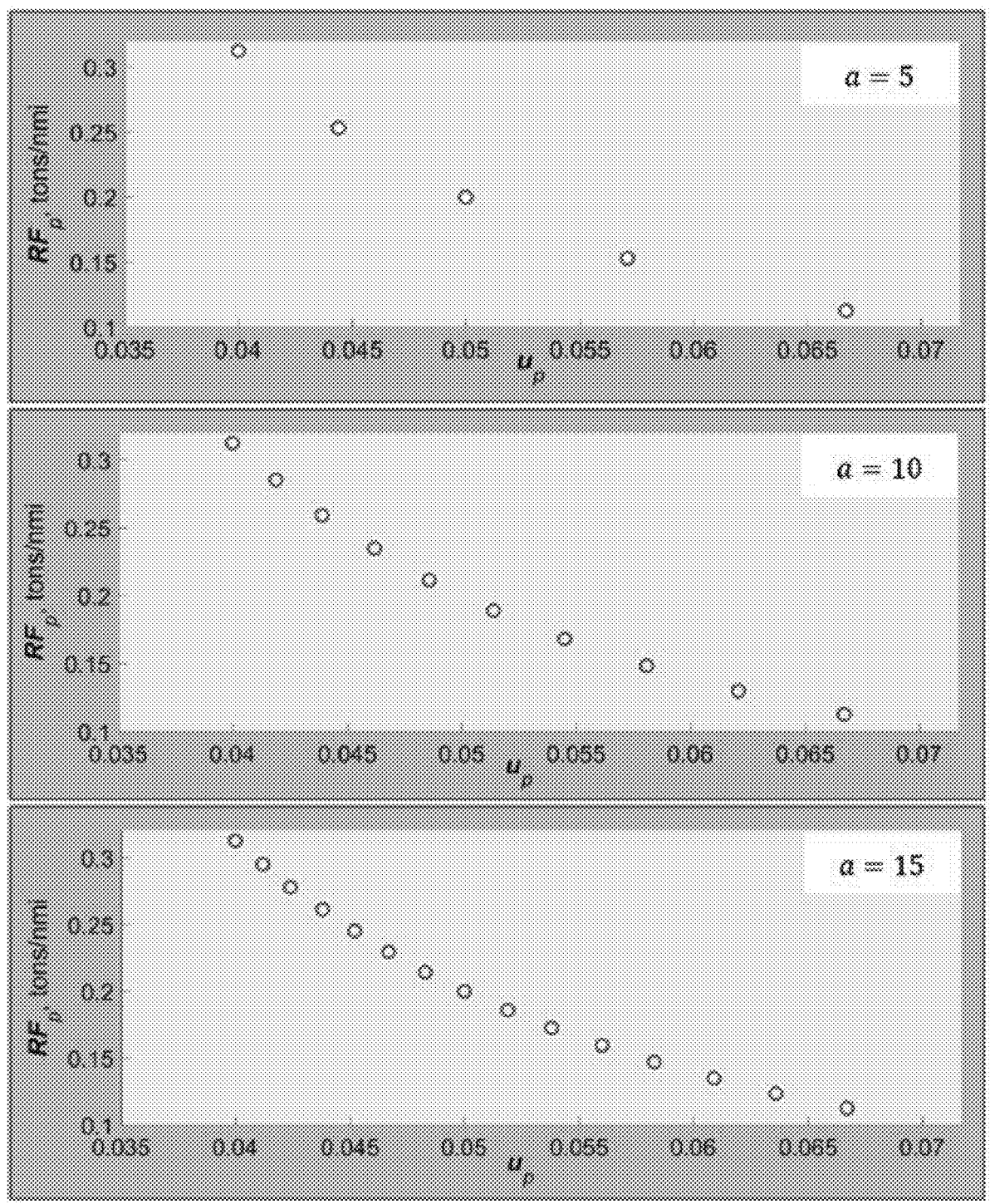
FIG. 4 depicts discretization of the fuel consumption function.

According to the discretization method, a continuous fuel consumption function $RF_p$ is replaced with a finite set of discrete points. Denote $K=\{1, \ldots, \alpha\}$ as a set of discrete points for the fuel consumption function; $u_k^{val}$ as the vessel sailing speed reciprocal value for discrete point k; $RF_k^{val}$ as the fuel consumption value, computed based on the vessel sailing speed reciprocal, for discrete point k. An increasing discretization level (a) improves an accuracy of approximation for the fuel consumption function, as demonstrated in FIG. 4.

Note that based on the available liner shipping literature the vessel sailing speed bounds were set to $v^{min}=15$ knots and $v^{max}=25$ knots (i.e., $1/25 \leq u_p \leq 1/15$, $p \in P$), while the fuel consumption values were computed from the following relationship [13], [20], [27]:

$$RF_p = \frac{0.012 \cdot (u_p)^{-2}}{24} \forall\, p \in P \text{ (tons/nmi)}$$

Let $y_{pk}=1$ if discrete point k is selected for computing the fuel consumption function at voyage leg p (=0 otherwise). The mixed integer nonlinear mathematical model CVSP can be reduced to a mixed integer linear mathematical model (which will be referred to as CVSPL) as follows.

---

CVSP: Linearized Collaborative Vessel Scheduling Problem $$\min \Bigg[ c^{OC}Q + c^{FC} \sum_{p \in P} l_p RF_p + \sum_{p \in P} \sum_{t \in T_p} \sum_{h \in H_{pt}} c_{pth}^{HC} x_{pth} + c^{IC} \sum_{p \in P} NC_p^{SEA} \quad (21)$$

$$ST_p + + \sum_{p \in P} c_p^{LT} LT_p \Bigg]$$

Subject to: (22)

Constraint sets (2)-(9), (12)-(19)

$$\sum_{k \in K} y_{pk} = 1 \forall\, p \in P$$

$$u_p = \sum_{k \in K} y_{pk} u_k^{val} \forall\, p \in P \quad (23)$$

$$RF_p = \sum_{k \in K} y_{pk} RF_k^{val} \forall\, p \in P \quad (24)$$

$$ST_p = l_p u_p \; \forall_p \in P \quad (25)$$

$$\frac{1}{v^{max}} \leq u_p \leq \frac{1}{v^{min}} \forall\, p \in P \quad (26)$$

---

The objective function (21) of the CVSPL mathematical model aims to minimize the total liner shipping route service cost. Constraint set (22) indicates that only one discrete point should be selected for calculating the fuel consumption function at each voyage leg of the given liner shipping route. Constraint set (23) computes the vessel sailing speed reciprocal for the selected discrete point at each voyage leg. Constraint set (24) calculates the fuel consumption for the selected discrete point at each voyage leg. Constraint set (25) estimates the vessel sailing time at each voyage leg. Constraint set (26) indicates that the vessel sailing speed reciprocal should be within a specific range at each voyage leg. The CVSPL mathematical model can be solved using commercial mixed integer programming solvers (e.g., CPLEX). As mentioned earlier, an increasing discretization level will improve an accuracy of approximation for the fuel consumption function; however, it will also increase the number of variables in the CVSPL mathematical model. The latter may also increase the computational time, required to solve the CVSPL mathematical model. An additional analysis will be conducted throughout the numerical experiments to select an appropriate discretization level, which will not affect the computational time significantly (details will be discussed below).

Numerical Experiments

The following is a detailed description of the numerical experiments, which were conducted in this study to assess efficiency of the adopted solution methodology and the collaborative agreement between the liner shipping company and marine container terminal operators.

Input Data

The input data for the CVSPL mathematical model and the Pacific Atlantic 1 liner shipping route were generated based on the available vessel scheduling and liner shipping literature [25], [27], [29]-[37]. The Pacific Atlantic 1 liner shipping route is composed of 19 ports of call, i.e., n=19 [25]. It was assumed that the marine container terminal operators were able to offer 4 vessel arrival TWs to the liner shipping company at each port of call (i.e., $|T_p|=4$ $\forall p \in P$). A total of 3 start times and 3 end times were assigned for each TW at each port (i.e., $|S_p|=|E_{pt}|=3$ $\forall p \in P$, $t \in T_p$). The start time s of TW t at port p was generated based on the following relationship:

$$TW^S_{(p+1)ts} = TW^S_{pts} + \frac{l_p}{U[v^{min}; v^{max}]} \forall p \in P,$$

$t \in T_p$, $s \in S_{pt}$ (hours), where U—is a notation, which will be adopted for the uniformly distributed pseudorandom numbers. The duration of TW t at port p was assigned as follows [25]: $TW^E_{pte} - TW^S_{pts} = U[24; 72]$ $\forall p \in P$, $t \in T_p$, $e \in E_{pt}$, $s \in S_{pt}$ (hours).

It was assumed that the liner shipping company was offered 4 handling rates at each port of call ($|H_{pt}|=4$ $\forall p \in P$, $t \in T_p$). The handling productivity under handling rate h at port p during TW t was estimated based on the following relationship: $HP_{pth} = HP^M_{pth} \pm U[0; 20]$ $\forall p \in P$, $t \in T_p$, $h \in H_{pt}$ (TEUs/hour), where $HP^M_{pth}$—is the mean handling productivity for handling rate h at port p during TW t (TEUs/hour). The mean handling productivity was assumed to be $HP^M_{pt} = [90; 120; 150; 180]$ $\forall p \in P$, $t \in T_p$ (TEUs/hour) for the available handling rates. The following relationship was used to compute the handling cost at port p under handling rate h during TW t: $c^{HC}_{pth} = NC^{PORT}_p \cdot (HC^M_h \pm U[0; 50])$ $\forall p \in P$, $t \in T_p$, $h \in H_{pt}$ (USD), where $HC^M_h$—is the mean handling cost per TEU under handling rate h (USD/TEU). The $HC^M_h$ values were set to [475; 550; 625; 700] (USD/TEU) for the available handling rates based on the available literature [35]. The rest of parameters, required for the CVSPL mathematical model, are presented in Table I.

TABLE 1

Numerical data.

| Parameter | Value |
| --- | --- |
| Fuel consumption function coefficients: $\alpha$, $\gamma$ | $\alpha = 3$, $\gamma = 0.012$ |
| Weekly vessel operational cost: $c^{OC}$ (USD/week) | 300,000 |
| Unit late vessel arrival penalty at ports: $c_p^{LT}$ $\forall p \in P$ (USD/hour) | U[5,000; 10,000] |
| Unit container inventory cost: $c^{IC}$ (USD per TEU per hour) | 0.5 |
| Unit fuel cost: $c^{FC}$ (USD/ton) | 300 |
| Total amount of containers transported at voyage legs: $NC_p^{SEA}$ $\forall p \in P$ (TEUs) | U[10,000; 15,000] |
| Total amount of containers handled at ports: $NC_p^{PORT}$ $\forall p \in P$ (TEUs) | U[500; 2,000] |
| Minimum vessel sailing speed: $v^{min}$ (knots) | 15 |
| Maximum vessel sailing speed: $v^{max}$ (knots) | 25 |
| Maximum number of vessels: $Q^{max}$ (vessels) | 15 |

A total of 20 problem instances were developed based on the adopted numerical data by changing the duration of TWs at ports of call and start/end times for each TW. Throughout this study, all computational experiments were conducted on a CPU with Dell Intel® Core™ i7 Processor and 32 GB of RAM. The CVSPL mathematical model was coded in General Algebraic Modeling System (GAMS), and CPLEX was used as the optimization solver. The relative optimality gap was restricted to 0.1%.

Solution Methodology Evaluation

In order to evaluate the solution to the problem discussed above, where the nonlinear fuel consumption function is replaced with a discretized approximation, a total of 18 discretization level cases were developed by changing the discretization level ($\alpha$) from 2 points to 50 points. The CVSPL mathematical model was solved for all the considered problem instances and discretization level cases, and results are reported in Table II. Table II provides the following data: (1) case number; (2) discretization level for a given case; and (3) mean computational time for a given case over the considered problem instances.

TABLE 2

Solution methodology evaluation results.

| Case | Discretization level, $\alpha$ | CPU time, sec. |
| --- | --- | --- |
| C1 | 2 | 0.1656 |
| C2 | 3 | 0.1742 |
| C3 | 4 | 0.1792 |
| C4 | 5 | 0.1830 |
| C5 | 6 | 0.1857 |
| C6 | 7 | 0.1898 |
| C7 | 8 | 0.1929 |
| C8 | 9 | 0.1955 |
| C9 | 10 | 0.1969 |
| C10 | 11 | 0.1997 |
| C11 | 12 | 0.2023 |
| C12 | 13 | 0.2050 |
| C13 | 14 | 0.2085 |
| C14 | 15 | 0.2123 |
| C15 | 20 | 0.2163 |
| C16 | 30 | 0.2207 |
| C17 | 40 | 0.2300 |
| C18 | 50 | 0.2384 |

It can be observed that an increasing discretization level from 2 points to 50 points increased the computational time, required to solve the CVSPL mathematical model, by 44.0% (i.e., from 0.1656 sec. to 0.2384 sec.). However, even for the highest discretization level (i.e., 50 points) the computational time can be considered as acceptable, which showcases efficiency of the solution methodology. Therefore, a total of 50 discrete points will be further used throughout the numerical experiments to approximate the fuel consumption function.

Collaborative Agreement Evaluation

The collaborative agreement, where multiple vessel arrival TWs, multiple start and end times for the available TWs, and multiple vessel handling rates during the available TWs are offered to the liner shipping company at each port (represented by the CVSPL mathematical model), will be compared to the alternative collaborative agreements, reported in the literature: (1) the marine container terminal operators offer multiple vessel arrival TWs to the liner shipping company, while the start/end times for TWs and the vessel handling rates are assumed to be fixed [20], [21], i.e. $|S_{pt}|=|E_{pt}|=|H_{pt}|=1$ (this collaborative agreement will be referred to as CVSPL-TW); and (2) the marine container terminal operators offer multiple vessel handling rates to the liner shipping company, while the vessel arrival TWs and start/end times for TWs are assumed to be fixed [23], [24], i.e. $|T_p|=|S_{pt}|=|E_{pt}|=1$ (this collaborative agreement will be referred to as CVSPL-HR). A total of 1,000 scenarios were generated for each problem instance by changing the handling rate at each port (randomly selected out of 4 available handling rates) for the CVSPL-TW mathematical model and the arrival TW at each port (randomly selected out of 4 available TWs) for the CVSPL-HR mathematical model.

Figure 5A:
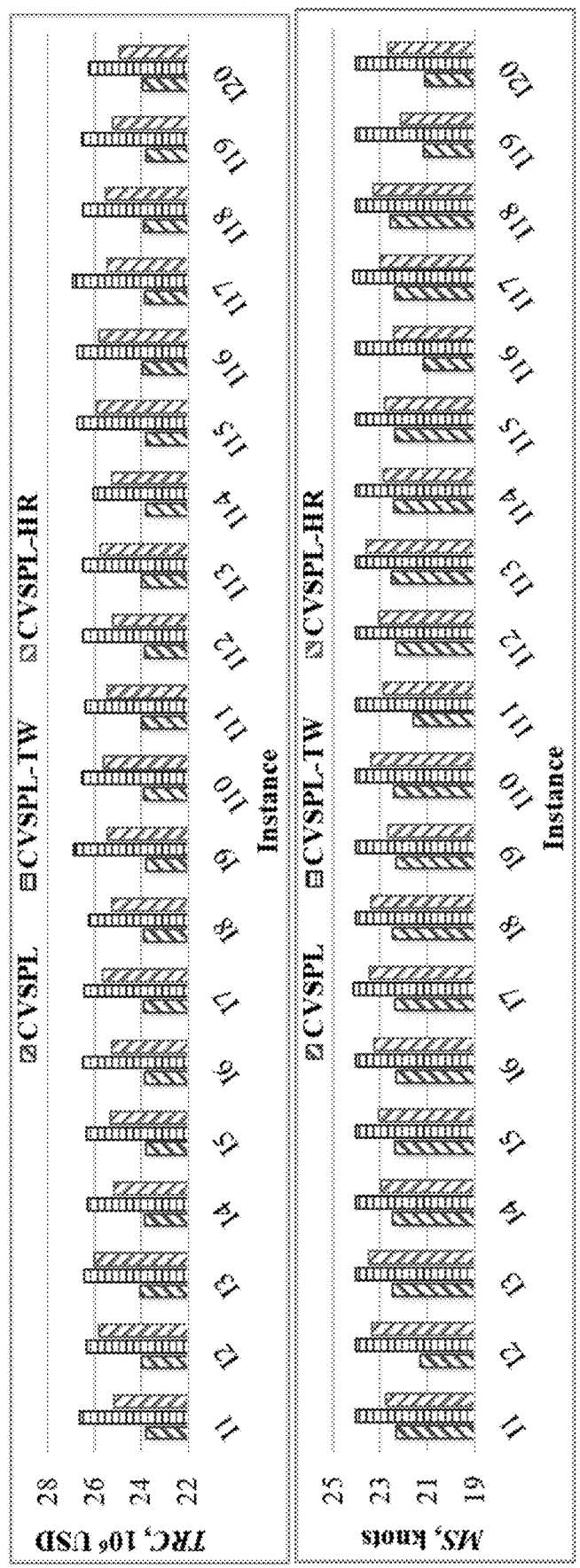
FIG. 5A depicts the average vessel schedule performance indicators for the CVSPL, CVSPL-TW, and CVSPL-HR collaborative agreements.
Figure 5B:
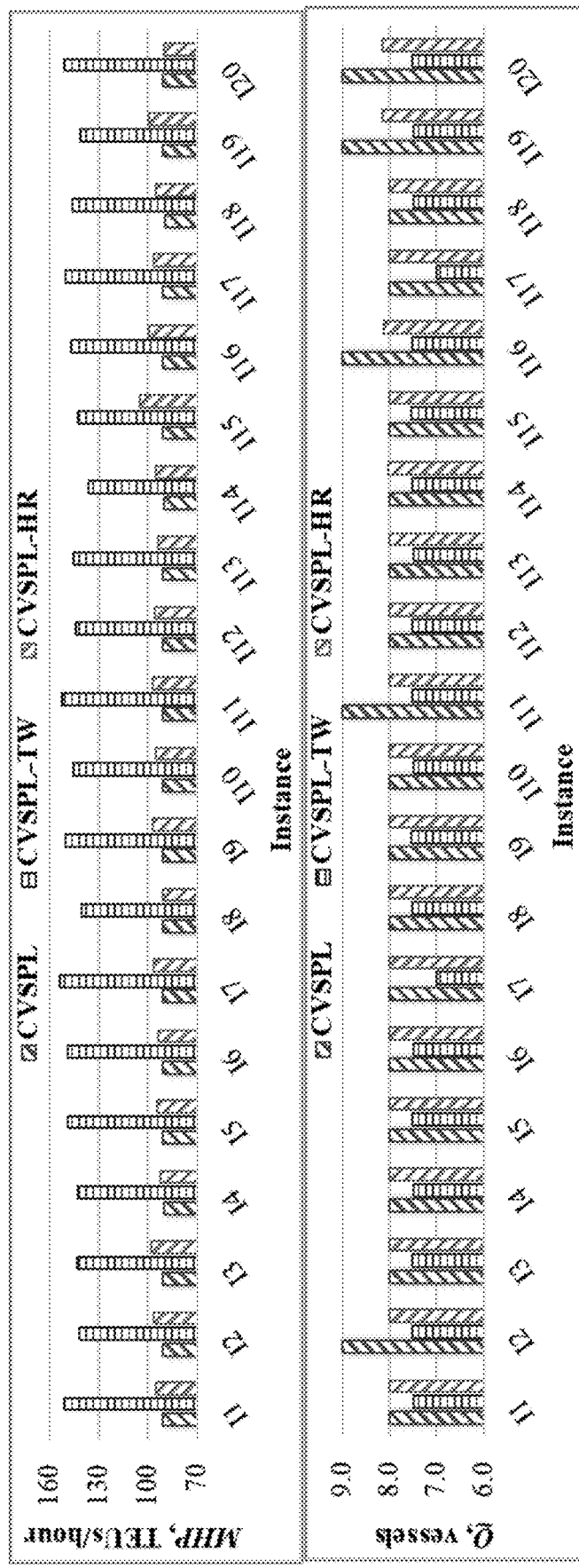
FIG. 5B depicts the average vessel schedule performance indicators for the CVSPL, CVSPL-TW, and CVSPL-HR collaborative agreements.
Figure 5C:
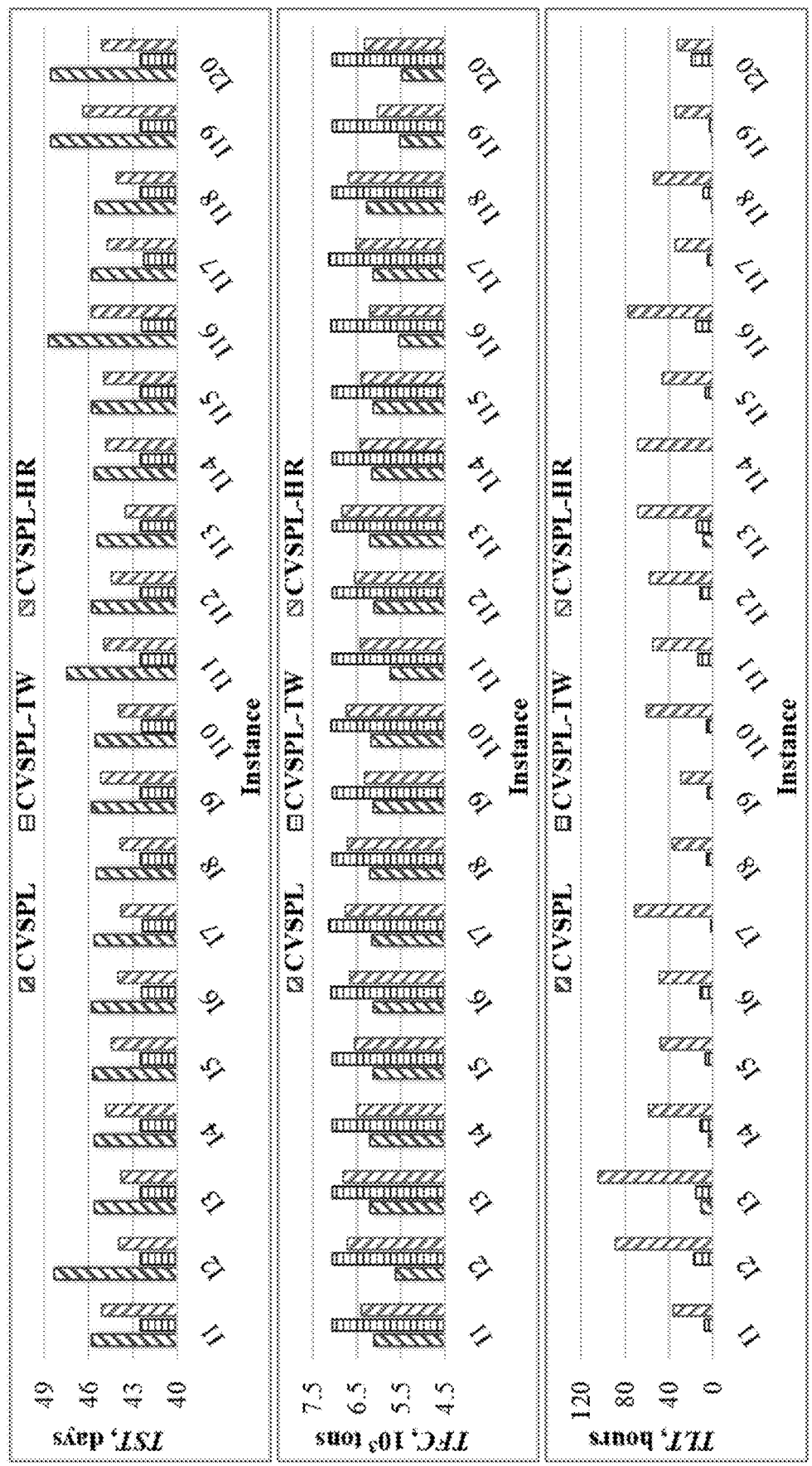
FIG. 5C depicts the average vessel schedule performance indicators for the CVSPL, CVSPL-TW, and CVSPL-HR collaborative agreements.

The CVSPL, CVSPL-TW, and CVSPL-HR mathematical models were solved for all 20 developed problems instances and 20,000 generated scenarios (1,000 scenarios per problem instance). The vessel schedules, produced by the CVSPL, CVSPL-TW, and CVSPL-HR mathematical models, were compared in terms of the following performance indicators: (1) total liner shipping route service cost—TRC; (2) mean vessel sailing speed—MS; (3) mean vessel handling productivity—MHP; (4) total number of vessels required for service of the given liner shipping route—Q; (5) total vessel sailing time—TST; (6) total fuel consumption by vessels—TFC; and (7) total vessel late arrival time at ports of call—TLT. The average values of the performance indicators over 1,000 scenarios are illustrated in FIG. 5 and provided in Table III for each problem instance.

Results from the conducted numerical experiments show that the collaborative agreement (CVSPL) outperformed the CVSPL-TW and CVSPL-HR collaborative agreements in terms of the total liner shipping route service cost on average by 10.9% and 6.6% respectively over the considered problem instances and generated scenarios. It was found that the mean vessel sailing speed was on average 8.6% and 4.1% lower for the CVSPL vessel schedules as compared to the CVSPL-TW and CVSPL-HR vessel schedules respectively. The latter finding can be supported by the fact that availability of multiple arrival TWs and multiple start/end times for each TW provided more flexibility to the NYK liner shipping company in selection of vessel sailing speeds at voyage legs of the Pacific Atlantic 1 liner shipping route (i.e., vessels were able to sail at lower speeds without violating the arrival TWs at ports). Higher mean vessel sailing speeds were recorded for the CVSPL-TW vessel schedules as compared to the CVSPL-HR vessel schedules, as the liner shipping company aimed to reduce the hours of late arrivals at ports of call. Specifically, the total late arrivals on average comprised ≈9.5 hours for the CVSPL-TW vessel schedules, while the CVSPL-HR vessel schedules on average incurred ≈55.6 hours of late vessel arrivals at ports. However, the least late arrivals (≈1.3 hours) were recorded for the CVSPL vessel schedules.

TABLE 3

Average vessel schedule performance indicators.

| | CVSPL | | | | | | |
|---|---|---|---|---|---|---|---|
| Inst. | TRC, $10^6$ USD | MS, knots | MHP, TEUs/ hour | Q, vessels | TST, days | TFC, $10^3$ tons | TLT, hours |
| I1 | 23.805 | 22.33 | 90.79 | 8.00 | 45.81 | 6.12 | 0.00 |
| I2 | 23.995 | 21.31 | 90.59 | 9.00 | 48.40 | 5.62 | 0.00 |
| I3 | 24.046 | 22.47 | 90.59 | 8.00 | 45.65 | 6.21 | 11.13 |
| I4 | 23.871 | 22.46 | 89.65 | 8.00 | 45.66 | 6.20 | 4.47 |
| I5 | 23.786 | 22.36 | 90.35 | 8.00 | 45.73 | 6.13 | 0.00 |
| I6 | 23.833 | 22.35 | 90.73 | 8.00 | 45.79 | 6.13 | 0.28 |
| I7 | 23.887 | 22.40 | 90.59 | 8.00 | 45.68 | 6.16 | 0.00 |
| I8 | 23.916 | 22.49 | 90.65 | 8.00 | 45.50 | 6.21 | 0.00 |
| I9 | 23.822 | 22.34 | 90.79 | 8.00 | 45.81 | 6.13 | 0.00 |
| I10 | 23.921 | 22.45 | 90.65 | 8.00 | 45.61 | 6.19 | 0.00 |
| I11 | 23.998 | 21.60 | 90.85 | 9.00 | 47.46 | 5.74 | 0.00 |
| I12 | 23.845 | 22.32 | 90.59 | 8.00 | 45.79 | 6.11 | 0.00 |
| I13 | 23.975 | 22.51 | 90.73 | 8.00 | 45.44 | 6.22 | 8.76 |
| I14 | 23.813 | 22.41 | 89.65 | 8.00 | 45.69 | 6.17 | 0.00 |
| I15 | 23.812 | 22.36 | 90.79 | 8.00 | 45.79 | 6.15 | 0.00 |
| I16 | 23.954 | 21.18 | 90.59 | 9.00 | 48.75 | 5.55 | 0.00 |
| I17 | 23.875 | 22.36 | 90.79 | 8.00 | 45.81 | 6.15 | 0.00 |
| I18 | 23.892 | 22.56 | 89.20 | 8.00 | 45.61 | 6.28 | 0.07 |
| I19 | 23.792 | 21.18 | 90.73 | 9.00 | 48.61 | 5.54 | 0.96 |
| I20 | 23.935 | 21.13 | 90.59 | 9.00 | 48.56 | 5.49 | 0.00 |
| | CVSPL-TW | | | | | | |
| Inst. | TRC, $10^6$ USD | MS, knots | MHP, TEUs/ hour | Q, vessels | TST, days | TFC, $10^3$ tons | TLT, hours |
| I1 | 26.622 | 24.02 | 150.54 | 7.49 | 42.52 | 7.07 | 7.59 |
| I2 | 26.343 | 24.02 | 141.24 | 7.50 | 42.52 | 7.07 | 17.97 |
| I3 | 26.438 | 24.03 | 143.24 | 7.51 | 42.50 | 7.08 | 15.83 |
| I4 | 26.308 | 24.02 | 141.99 | 7.48 | 42.52 | 7.07 | 12.13 |
| I5 | 26.337 | 24.02 | 148.41 | 7.51 | 42.52 | 7.07 | 6.64 |
| I6 | 26.509 | 24.05 | 148.38 | 7.49 | 42.46 | 7.09 | 11.54 |
| I7 | 26.459 | 24.12 | 153.15 | 7.00 | 42.34 | 7.13 | 2.20 |
| I8 | 26.231 | 24.02 | 140.40 | 7.50 | 42.52 | 7.07 | 5.79 |
| I9 | 26.868 | 24.02 | 149.83 | 7.53 | 42.52 | 7.07 | 5.35 |
| I10 | 26.555 | 24.05 | 144.70 | 7.47 | 42.46 | 7.09 | 6.39 |
| I11 | 26.400 | 24.02 | 152.09 | 7.50 | 42.52 | 7.07 | 13.65 |
| I12 | 26.487 | 24.02 | 143.40 | 7.51 | 42.52 | 7.07 | 12.14 |
| I13 | 26.494 | 24.03 | 144.89 | 7.47 | 42.49 | 7.08 | 14.57 |
| I14 | 26.060 | 24.02 | 135.96 | 7.50 | 42.52 | 7.07 | 0.00 |
| I15 | 26.746 | 24.02 | 142.03 | 7.52 | 42.52 | 7.07 | 6.78 |
| I16 | 26.710 | 24.06 | 146.10 | 7.50 | 42.45 | 7.09 | 16.15 |
| I17 | 26.947 | 24.14 | 150.00 | 7.00 | 42.31 | 7.14 | 5.07 |
| I18 | 26.479 | 24.02 | 146.09 | 7.47 | 42.51 | 7.07 | 8.54 |
| I19 | 26.542 | 24.02 | 140.59 | 7.48 | 42.52 | 7.07 | 2.73 |
| I20 | 26.237 | 24.02 | 150.37 | 7.50 | 42.52 | 7.07 | 19.91 |
| | CVSPL-HR | | | | | | |
| Inst. | TRC, $10^6$ USD | MS, knots | MHP, TEUs/ hour | Q, vessels | TST, days | TFC, $10^3$ tons | TLT, hours |
| I1 | 25.177 | 22.78 | 94.70 | 8.00 | 45.12 | 6.40 | 35.80 |
| I2 | 25.817 | 23.36 | 96.41 | 8.00 | 43.97 | 6.72 | 89.12 |
| I3 | 25.999 | 23.49 | 97.31 | 8.00 | 43.84 | 6.81 | 104.58 |
| I4 | 25.191 | 22.95 | 91.94 | 8.00 | 44.86 | 6.50 | 58.92 |
| I5 | 25.297 | 23.07 | 94.06 | 8.00 | 44.46 | 6.55 | 48.32 |
| I6 | 25.283 | 23.28 | 93.22 | 8.00 | 44.07 | 6.67 | 49.09 |
| I7 | 25.646 | 23.44 | 96.25 | 8.00 | 43.86 | 6.77 | 71.29 |
| I8 | 25.285 | 23.39 | 90.83 | 8.00 | 43.88 | 6.74 | 37.34 |
| I9 | 25.465 | 22.68 | 96.66 | 8.00 | 45.24 | 6.34 | 28.96 |

TABLE 3-continued

| | | | | | | | |
|---|---|---|---|---|---|---|---|
| I10 | 25.607 | 23.39 | 94.72 | 8.00 | 43.97 | 6.75 | 60.92 |
| I11 | 25.481 | 22.86 | 96.88 | 8.00 | 44.97 | 6.44 | 54.36 |
| I12 | 25.233 | 23.09 | 95.49 | 8.00 | 44.49 | 6.57 | 57.94 |
| I13 | 25.757 | 23.59 | 93.38 | 8.00 | 43.54 | 6.85 | 68.57 |
| I14 | 25.272 | 22.87 | 94.63 | 8.01 | 44.89 | 6.44 | 68.18 |
| I15 | 25.902 | 22.83 | 104.29 | 8.00 | 45.01 | 6.42 | 46.23 |
| I16 | 25.822 | 22.45 | 99.01 | 8.12 | 45.83 | 6.22 | 76.86 |
| I17 | 25.447 | 22.99 | 96.07 | 8.00 | 44.76 | 6.52 | 33.96 |
| I18 | 25.496 | 23.32 | 94.58 | 8.00 | 44.10 | 6.71 | 53.97 |
| I19 | 25.227 | 22.14 | 98.95 | 8.14 | 46.40 | 6.04 | 34.46 |
| I20 | 24.903 | 22.69 | 90.02 | 8.14 | 45.19 | 6.33 | 32.75 |

A reduction in the mean vessel sailing speed further decreased the fuel consumption for the CVSPL vessel schedules. Specifically, the total fuel consumption was 17.5% and 8.5% lower for the CVSPL vessel schedules as compared to the CVSPL-TW and CVSPL-HR vessel schedules respectively. In the meantime, selection of lower vessel sailing speeds at voyage legs of the Pacific Atlantic 1 liner shipping route led to increase in the total sailing time. The total sailing time averaged on 46.4 days, 42.5 days, and 44.6 days over the developed problem instances and generated scenarios for the CVSPL, CVSPL-TW, and CVSPL-HR vessel schedules respectively. Furthermore, the availability of multiple handling rates at ports of call allowed the liner shipping company requesting handling rates with lower handling productivities in case of the CVSPL and CVSPL-HR vessel schedules, which further reduced the total vessel handling cost at ports of call. However, increasing sailing time (as a result of the slow steaming) and vessel handling time (as a result of requesting handling rates with lower handling productivities) caused an increase in the total turnaround time of vessels for the CVSPL vessel schedules. Due to increasing total vessel turnaround time, the NYK liner shipping company had to deploy more vessels to guarantee the weekly service frequency at ports of call. The number of vessels, required by the CVSPL collaborative agreement, was on average 9.8% and 2.8% higher as compared to the CVSPL-TW and CVSPL-HR vessel schedules respectively. Nevertheless, the least total liner shipping route service costs were recorded for the CVSPL vessel schedules.

Therefore, the collaborative agreement, where multiple vessel arrival TWs, multiple start and end times for TWs, and multiple vessel handling rates are offered to the liner shipping company by the marine container terminal operators, can improve efficiency of the liner shipping operations and yield substantial cost savings.

Sensitivity Analysis

The scope of numerical experiments also includes a detailed assessment of the vessel arrival TW duration, weekly vessel operational cost, and unit fuel cost effects on the monetary savings that could be achieved from implementation of the collaborative agreement. Results of the conducted analysis are reported as follows.

Figure 6:
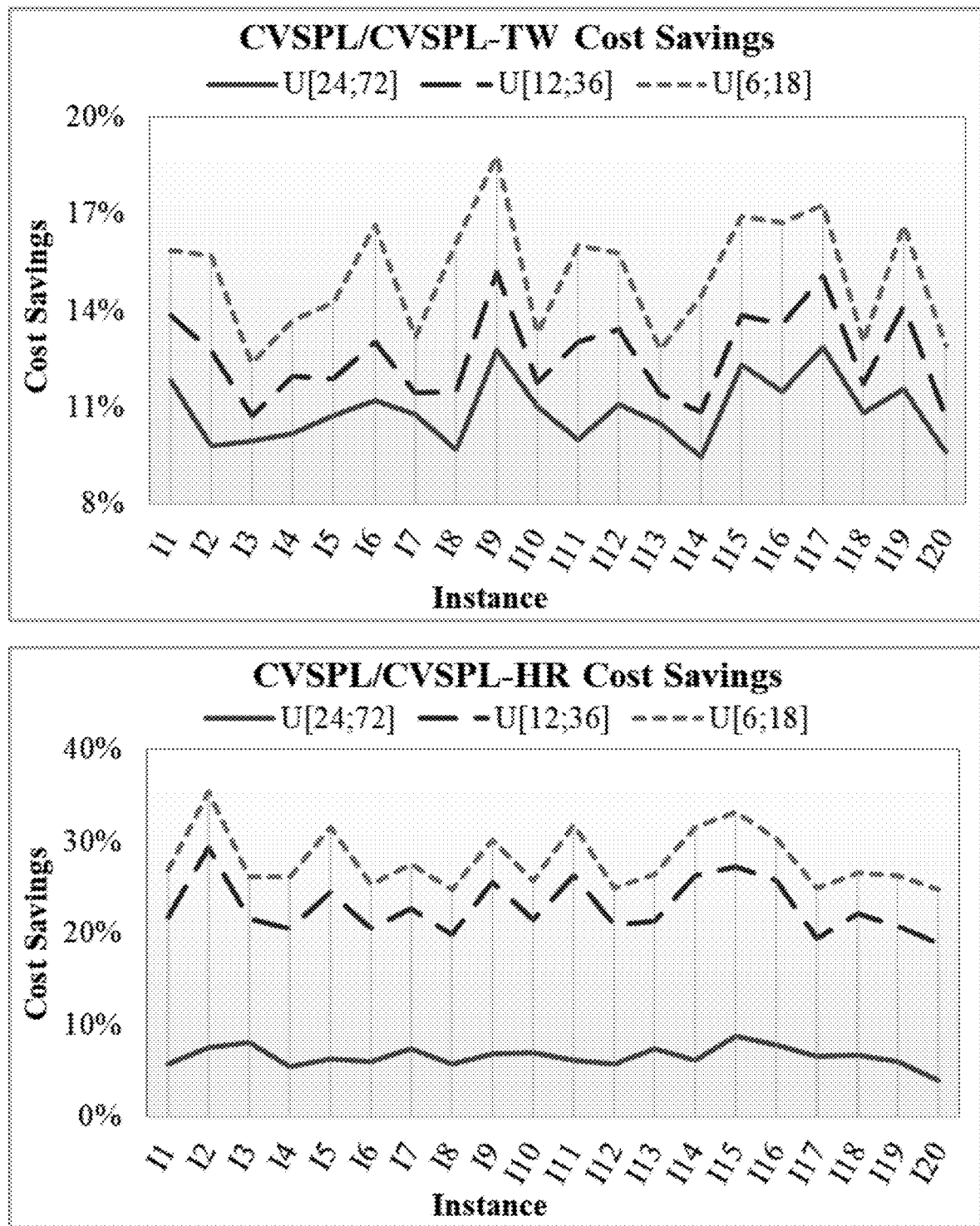
FIG. 6 depicts the average cost savings for the considered TW duration cases.

Vessel Arrival TW Duration. The CVSPL collaborative agreement was evaluated against the CVSPL-TW and CVSPL-HR collaborative agreements for the following vessel arrival TW duration cases: (1) U[24; 72]—the arrival TW varies from 24 hours to 72 hours ($Case_1^{TW}$); (2) U[12; 36]—the arrival TW varies from 12 hours to 36 hours ($Case_2^{TW}$); and (3) U[6; 18]—the arrival TW varies from 6 hours to 18 hours ($Case_3^{TW}$). The mathematical models were solved for all the developed problems instances (described previously), generated scenarios (described previously), and considered TW duration cases. The average over 1,000 scenarios total liner shipping route service cost savings of the CVSPL vessel schedules over the CVSPL-TW and CVSPL-HR vessel schedules (that will be referred to as the CVSPL/CVSPL-TW and CVSPL/CVSPL-HR cost savings respectively) are presented in FIG. 6 for each problem instance and each TW duration case.

It was found that decreasing TW duration from $Case_1^{TW}$ to $Case_2^{TW}$ and $Case_3^{TW}$ increased the CVSPL/CVSPL-TW cost savings on average by 1.7% and 4.2% respectively over the generated problems instances and scenarios. Therefore, selection of the start and end times for the vessel arrival TWs becomes more critical for the cases with narrow TWs. The conducted analysis also demonstrates that decreasing TW duration from $Case_1^{TW}$ to $Case_2^{TW}$ and $Case_3^{TW}$ increased the CVSPL/CVSPL-HR cost savings on average by 16.2% and 21.4% respectively over the generated problems instances and scenarios. A high sensitivity of the CVSPL-HR vessel schedules to the TW duration can be explained by the fact that the NYK liner shipping company is not offered multiple vessel arrival TWs by the marine container terminal operators under the CVSPL-HR collaborative agreement (i.e., only one fixed TW is offered at each port), and any changes in the duration of the available TW at a given port may cause significant changes in the vessel schedules.

Weekly Vessel Operational Cost and Unit Fuel Cost. The weekly vessel operational cost ($c^{OC}$, USD/week) and the unit fuel cost ($c^{FC}$, USD/ton) are the major factors that have to be considered by the NYK liner shipping company in the design of vessel schedules. Taking into account potential changes in both weekly vessel operational and unit fuel costs, the NYK liner shipping company will be required to make necessary adjustments in vessel schedules. An additional analysis was performed to assess changes in the CVSPL/CVSPL-TW and CVSPL/CVSPL-HR cost savings for different combinations of the $c^{OC}$ and $c^{FC}$ values. A total of 64 $c^{OC}/c^{FC}$ combinations were generated by changing the $c^{OC}$ value from 200,000 USD/week to 550,000 USD/week with an increment of 50,000 USD/week, while the $c^{FC}$ value was altered from 250 USD/ton to 600 USD/ton with an increment of 50 USD/ton [20], [21], [23], [27].

Figure 7:
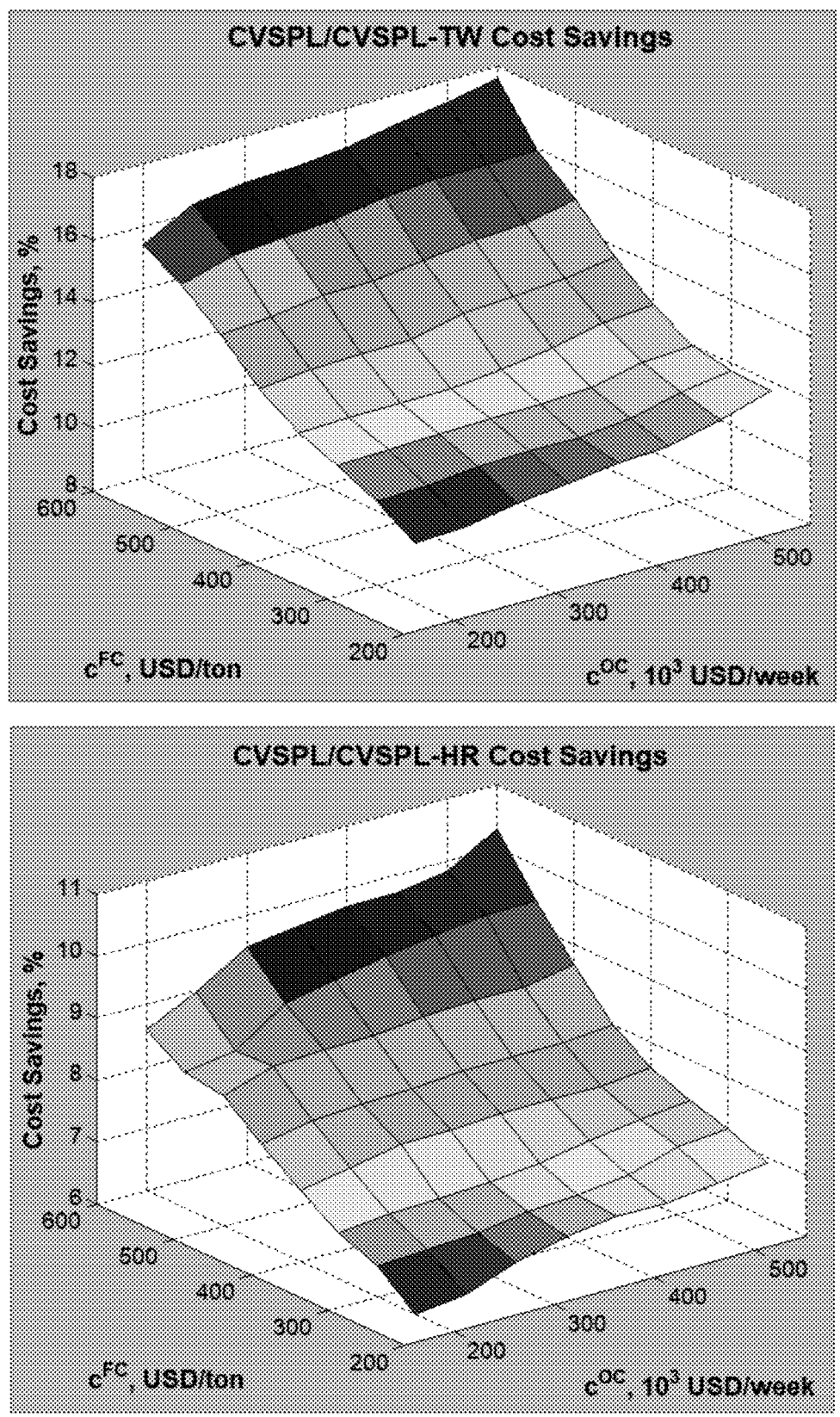
FIG. 7 depicts the average cost savings for the considered weekly vessel operational cost ($c^{OC}$, USD/week) and unit fuel cost ($c^{FC}$, USD/ton) combinations.

The CVSPL, CVSPL-TW, and CVSPL-HR mathematical models were solved for all the developed problems instances (described previously), generated scenarios (described previously), and considered $c^{OC}/c^{FC}$ combinations. The average over the generated problems instances and scenarios CVSPL/CVSPL-TW and CVSPL/CVSPL-HR cost savings are presented in FIG. 7 for each $c^{OC}/c^{FC}$ combination. Results of the conducted analysis showcase that both CVSPL/CVSPL-TW and CVSPL/CVSPL-HR cost savings are increasing with increasing $c^{OC}$ and $c^{FC}$ values. Specifically, an increase of $c^{OC}$ from 200,000 USD/week to 550,000 USD/week and $c^{FC}$ from 250 USD/ton to 600 USD/ton increased the CVSPL/CVSPL-TW cost savings from 9.9% to 17.7%, while the CVSPL/CVSPL-HR cost savings increased from 6.0% to 10.3%. Throughout the numerical experiments, it was observed that the CVSPL-TW vessel schedules were highly sensitive to the increasing $c^{FC}$ value. The latter finding can be explained by the fact that the NYK liner shipping company had to decrease the vessel sailing speed (in order to reduce the fuel consumption and associated costs), which further increased the total late vessel arrivals at ports despite the availability of multiple arrival TWs.

Thus, efficient collaborative agreements between liner shipping companies and marine container terminal operators, as the one discussed herein, become even more important, when the $c^{OC}$ and $c^{FC}$ values increase.

Broader Impacts

Along with the liner shipping route service cost savings, the current collaborative agreement may provide a set of additional advantages to liner shipping companies. This study does not model production of emissions by vessels. However, production of both greenhouse gas (e.g., carbon dioxide, methane, nitrous oxide) and non-greenhouse gas (e.g., nitrogen oxide, sulphur oxide, carbon monoxide, non-methane volatile organic compounds, particulate matter) emissions is proportional to the total fuel consumption [30], [32]. Numerical experiments demonstrate that the current collaborative agreement reduces the total fuel consumption on average by 17.5% and 8.5% as compared to the existing collaborative agreements, where either vessel arrival TWs or handling rates are offered to the liner shipping company at ports respectively. Hence, application of the suggested collaborative agreement will reduce the total amount of greenhouse and non-greenhouse gas emissions produced, which will further improve energy efficiency and environmental sustainability of the liner shipping operations.

Furthermore, this study does not explicitly model potential vessel arrival delays at ports of call due to adverse weather conditions, increasing height of waves, high speed of wind, and other factors. However, delays in vessel arrivals may significantly disrupt operations at marine container terminals. Based on the collaborative agreement, the liner shipping company is offered not only vessel arrival TWs by each marine container terminal operator, but also start and end times for the available TWs. A flexibility in selection of start and end times for each TW will allow the liner shipping company increasing duration of TWs at certain ports of call (where late vessel arrivals have been frequently reported due to different factors), which will increase the probability of timely vessel arrival at those ports. Therefore, the suggested collaborative agreement can improve reliability of both liner shipping and marine container terminal operations.

CONCLUSIONS

Liner shipping companies and marine container terminal operators have to focus on development and implementation of innovative strategies in order to enhance effectiveness of their operations and cope with the growing demand for the international seaborne trade. Increasing size of vessels and strategic formation of alliances were found to be the most common strategies adopted by liner shipping companies over the last years. However, efficiency of the liner shipping operations is substantially affected with a proper design of vessel schedules. In order to facilitate construction of efficient vessel schedules, this study discussed and evaluated a novel collaborative agreement between liner shipping companies and marine container terminal operators, according to which the liner shipping company was offered multiple vessel arrival time windows, multiple start and end times for the available time windows, and multiple vessel handling rates during the available time windows by the marine container terminal operator at each port of call. The vessel scheduling problem was formulated as a mixed integer nonlinear programming model, where the total liner shipping route service cost was minimized. A set of linearization techniques were applied to linearize the original formulation, and CPLEX was used to solve the linearized version of the model. A number of computational experiments were conducted for the Pacific Atlantic 1 liner shipping route, served by the NYK liner shipping company.

Findings indicate that the adopted solution methodology was efficient in terms of computational time. Moreover, the collaborative agreement outperformed the existing collaborative agreements, where either vessel arrival time windows or handling rates were offered to the liner shipping company, in terms of the total liner shipping route service cost by 10.9% and 6.6% respectively. Results from the conducted sensitivity analysis indicate that decreasing vessel arrival time window duration, increasing weekly vessel operational cost, and increasing unit fuel cost further increased monetary savings that could be achieved from the collaborative agreement over the existing collaborative agreements. Therefore, the current collaborative agreement can be considered as an efficient alternative for improving the liner shipping operations.

REFERENCES

1. UNCTAD, "Review of Maritime Transport 2016," United Nations Conference on Trade and Development, New York and Geneva, 2016.
2. C. Caballini, C. Pasquale, S. Sacone, and S. Siri, "An event-triggered receding-horizon scheme for planning rail operations in maritime terminals," *IEEE Trans. Intell. Transp. Syst.*, vol. 13, no. 3, pp. 365-375, September 2013.
3. A. Alessandri, C. Cervellera, and M. Gaggero, "Predictive control of container flows in maritime intermodal terminals," *IEEE Trans. Control Syst. Technol.*, vol. 21, no. 4, pp. 1423-1431, July 2012.
4. L. Chen, D. Zhang, X. Ma, L. Wang, S. Li, Z. Wu, and G. Pan, "Container port performance measurement and comparison leveraging ship GPS traces and maritime open data," *IEEE Trans. Intell. Transp. Syst.*, vol. 15, no. 1, pp. 1227-1242, December 2015.
5. M. A. Dulebenets, "Application of evolutionary computation for berth scheduling at marine container terminals: Parameter tuning versus parameter control," *IEEE Trans. Intell. Transp. Syst.*, vol. 19, no. 1, pp. 25-37, January 2018.
6. S. Abatte, M. Avvenuti, P. Corsini, B. Panicucci, M. Passacantando, and A. Vecchio, "An integer linear programming approach for radio-based localization of shipping containers in the presence of incomplete proximity information," *IEEE Trans. Intell. Transp. Syst.*, vol. 13, no. 3, pp. 1404-1419, March 2012.
7. World Shipping Council. (June 2015). *Some Observations on Port Congestion. Vessel Size and Vessel Sharing Agreements*. [Online]. Available: www.worldshipping.org.
8. Maersk. (May 2017). *The World's Largest Ship*. [Online]. Available: http://www.rmaersk.com/en/hardware/triple-e.
9. Journal of Commerce. (May 2017). *First of 11 record-breaking Maersk ships enters Asia-Europe*. [Online]. Available: www.joc.com.
10. Journal of Commerce. (July 2015). *Largest container ships on order to rise 13 percent by 2020*. [Online]. Available: www.joc.com.
11. Flexport. (April 2017). *What the new ocean carrier alliances mean for your freight*. [Online]. Available: https://www.flexport.com/blog/what-are-ocean-alliances/.
12. Q. Meng, S. Wang, H. Andersson, and K. Thun, "Containership routing and scheduling in liner shipping: Overview and future research directions," *Transp. Sci.*, vol. 48, no. 2, pp. 265-280, May 2014.

13. M. A. Dulebenets and E. E. Ozguven, "Vessel scheduling in liner shipping: Modeling transport of perishable assets," *Int. J. Prod. Econ.*, vol. 184, pp. 141-156, February 2017.
14. Y. Alix, B. Slack, and C. Comtois, "Alliance or acquisition? Strategies for growth in the container shipping industry, the case of CP ships," *J. Transp. Geogr.*, vol. 7, no. 3, pp. 203-208, September 1999.
15. R. Agarwal and E. Ergun, "Network design and allocation mechanisms for carrier alliances in liner shipping," *Oper. Res.*, vol. 58, no. 6, pp. 1726-1742, December 2010.
16. P. Panayides and R. Wiedmer, "Strategic alliances in container liner shipping," *Res. Transp. Econ.*, vol. 32, no. 1, pp. 25-38, August 2011.
17. J. Ding and G. Liang, "Using fuzzy MCDM to select partners of strategic alliances for liner shipping," *Inform. Sci.*, vol. 173, no. 1, pp. 197-225, June 2005.
18. L. Lei, C. Fan, M. Boile, and S. Theofanis, "Collaborative vs. non-collaborative container-vessel scheduling," *Transp. Res. Part E*, vol. 44, no. 3, pp. 504-520, May 2008.
19. D. Yang, M. Liu, and X. Shi, "Verifying liner Shipping Alliance's stability by applying core theory," *Res. Transp. Econ.*, vol. 32, no. 1, pp. 15-24, August 2011.
20. S. Wang, A. Alharbi, and P. Davy, "Liner ship route schedule design with port time windows," *Transp. Res. Part C*, vol. 41, pp. 1-17, April 2014.
21. A. Alhrabi, S. Wang, and P. Davy, "Schedule design for sustainable container supply chain networks with port time windows," *Adv. Eng. Informat.*, vol. 29, no. 3, pp. 322-331, August 2015.
22. S. Wang, Z. Liu, and X. Qu, "Collaborative mechanisms for berth allocation," *Adv. Eng. Informat.*, vol. 29, no. 3, pp. 332-338, August 2015.
23. M. A. Dulebenets, "Models and solution algorithms for improving operations in marine transportation," Ph.D. Dissertation, Dept. Civ. Eng., Univ. Memphis, Memphis, Tenn., 2015.
24. Z. Liu, S. Wang, Y. Du, and H. Wang, "Supply chain cost minimization by collaboration between liner shipping companies and port operators," *Transp. J.*, vol. 55, no. 3, pp. 1-19, August 2016.
25. NYK. (May 2017). *Container service network*. [Online]. Available: https://www.nykline.com.
26. Sea-Distances.org. (May 2017). *Distances between ports*. [Online]. Available: https://sea-distances.org/.
27. S. Wang and Q. Meng, "Sailing speed optimization for container ships in a liner shipping network," *Transp. Res. Part E*, vol. 48, no. 3, pp. 701-714, May 2012.
28. S. Wang, Q. Meng, and Z. Liu, "Bunker consumption optimization methods in shipping: A critical review and extensions," *Transp. Res. Part E*, vol. 53, pp. 49-62, July 2013.
29. M. A. Dulebenets, E. E. Ozguven, R. Moses, and M. B. Ulak, "Intermodal freight network design for transport of perishable products," *Open J. Optim.*, vol. 5, no. 04, pp. 120-139, December 2016.
30. M. A. Dulebenets, "The green vessel scheduling problem with transit time requirements in a liner shipping route with emission control areas," *Alexandria Eng. J.*, pp. 1-12, January 2017.
31. M. A. Dulebenets, "The vessel scheduling problem in a liner shipping route with heterogeneous vessel fleet," *Int. J. Civ. Eng.*, vol. 16, no. 1, pp. 19-32, January 2018.
32. M. A. Dulebenets, "Advantages and disadvantages from enforcing emission restrictions within emission control areas," *Maritime Bus. Rev.*, vol. 1, no. 02, pp. 107-132, December 2016.
33. M. A. Dulebenets, "A new simulation model for a comprehensive evaluation of yard truck deployment strategies at marine container terminals," *Open Sci. J.*, pp. 1-28, October 2016.
34. S. Zampelli, Y. Vergados, R. Van Schaeren, W. Dullaert, and B. Raa, "The berth allocation and quay crane assignment problem using a CP approach," in *Principles and Practice of Constraint Programming*, vol. 8124. Springer, 2013, pp. 880-896. [Online]. Available: http://link.springer.com/chapter/10.1007/978-3-642-40627-0_64
35. World Bank. (May 2017). *Cost to import (US$ per container)*. [Online]. Available: http://data.worldbank.org/.
36. M. A. Dulebenets, "Green vessel scheduling in liner shipping: Modeling carbon dioxide emission costs in sea and at ports of call," *Int. J. Transp. Sci. Technol.*, vol. 7, no. 1, pp. 26-44, March 2018
37. M. A. Dulebenets, "Bunker consumption optimization in liner shipping: A metaheuristic approach," *Int. J. Recent Innov. Trends Comput. Commun.*, vol. 3, no. 06, pp. 3766-3776, June 2015.

Applications and Improvements

Certain embodiments of the claimed subject matter provide specific applications and ways of automating the creation of a vessel schedules that incorporates mixed integer nonlinear optimization model incorporating elements from multiple sources in order to solve a problem faced by Liner shipping companies and marine container terminal operators.

Certain embodiments of the claimed subject matter provide improvements to the automatic creation of a novel collaborative agreement between liner shipping companies and marine container terminal operators. Certain embodiments of the claimed subject matter provide improvements to automatic generation of collaborative agreements in which the liner shipping company was offered multiple vessel arrival time windows, multiple start and end times for the available time windows, and multiple vessel handling rates during the available time windows by the marine container terminal operator at each port of call.

Certain embodiments provide a means for configuring memory to store the automated vessel schedule creation using the methods described herein, providing a specific improvement in the memory storage and retrieval when creating multi-objective mixed integer nonlinear optimization of vessel schedules. The vessel scheduling problem was formulated as a mixed integer nonlinear programming model, where the total liner shipping route service cost was minimized. A set of linearization techniques were applied to linearize the original formulation, and CPLEX was used to solve the linearized version of the model.

Hardware and Software Infrastructure Examples

The present invention may be embodied on various computing platforms that perform actions responsive to software-based instructions and most particularly on touchscreen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object-oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of automatically generating collaborative agreements between a liner shipping company and a marine container terminal operator, the method comprising:
   providing a computer with a graphical user interface and a processor, the computer disposed on a marine vessel;
   retrieving, via the processor, a set of factors from a computing unit disposed at a marine container terminal, the set of factors including a plurality of arrival time windows for the marine vessel arriving at the marine container terminal, each of the plurality of time windows including a start time and an end time;
   delivering the set of factors from the computing unit disposed at a marine container terminal to the computer disposed on the marine vessel;
   determining an optimal collaborative agreement between the liner shipping company and the marine container terminal operator using a mixed integer nonlinear programming model by:
      calculating, via the computer disposed on the marine vessel, a fuel consumption estimate depending on the marine vessel speed and a cargo weight associated with the marine vessel;
      modeling, via the computer disposed on the marine vessel, each of the plurality of arrival time windows based on the marine vessel speed and the fuel consumption estimate;
      discretizing, via the computer disposed on the marine vessel, the model associated with each of the plurality of arrival time windows; and
      selecting, via the computer disposed on the marine vessel, one of the plurality of arrival time windows that is associated with the optimal model;
   wherein the mixed integer nonlinear programming model is linearized using a set of linearization techniques, and CPLEX is applied to solve the linearized model executed by the processor in the computer to automatically generate the optimal collaborative agreement and delivering the optimal collaborative agreement to the graphical user interface;

wherein the mixed integer nonlinear programming model improves the generation of optimal collaborative agreements;

wherein the delivery of the optimal collaborative agreement is automatically delivered to the liner shipping company and the marine container terminal operator;

wherein the delivery of the optimal collaborative agreement automatically adjusts the speed and course of the marine vessel to implement the optimal collaborative agreement; and wherein the improved automatically generated optimal collaborative agreement minimizes a total liner shipping route service cost.

2. The method of claim 1, further comprising the step of transmitting, via the computing unit disposed at the marine container terminal, and receiving via the computing unit disposed on the marine vessel, a plurality of vessel handling rates, each of the plurality of vessel handling rates associated with one of the plurality of arrival time windows.

3. The method of claim 1, wherein the step of modeling each of the plurality of arrival time windows further comprises a step of calculating an impact associated with an environmental variable on the marine vessel during translation to the marine container terminal, the environmental variable selected from the group consisting of a weather event and a number of crew members associated with the marine vessel.

4. One or more tangible non-transitory computer-readable media having computer-executable instructions for performing a method of running a software program on a computing device, the computing device operating under an operating system, the method including issuing instructions from the software program comprising steps including:

retrieving, via a processor associated with the computing device disposed on a marine vessel, a set of factors;

delivering the set of factors from a computing unit disposed at a marine container terminal to the computing device disposed on a marine vessel;

determining an optimal collaborative agreement between the liner shipping company and the marine container terminal operator using a mixed integer nonlinear programming model by:

calculating, via the computing device disposed on the marine vessel, a fuel consumption estimate depending on the marine vessel speed and a cargo weight associated with the marine vessel;

modeling, via the computing device disposed on the marine vessel, each of the plurality of arrival time windows based on the marine vessel speed and the fuel consumption estimate;

discretizing, via the computing device disposed on the marine vessel, the model associated with each of the plurality of arrival time windows; and selecting, via the computing device disposed on the marine vessel, one of the plurality of arrival time windows that is associated with the optimal model;

wherein the mixed integer nonlinear programming model is linearized using a set of linearization techniques, and CPLEX is applied to solve the linearized model executed by the processor associated with the computing device disposed on the marine vessel to automatically generate the optimal collaborative agreement and delivering the optimal collaborative agreement to a graphical user interface of the computing device disposed on the marine vessel;

wherein the mixed integer nonlinear programming model improves the generation of optimal collaborative agreements;

wherein the delivery of the optimal collaborative agreement is automatically delivered to a liner shipping company associated with the marine vessel and a marine container terminal operator associated with the marine container terminal;

wherein the delivery of the optimal collaborative agreement automatically adjusts the speed and course of the marine vessel to implement the optimal collaborative agreement; and wherein the improved automatically generated optimal collaborative agreement minimizes a total liner shipping route service cost.

* * * * *